(12) United States Patent
Guerin et al.

(10) Patent No.: US 9,346,212 B2
(45) Date of Patent: May 24, 2016

(54) DEEP GRIP MECHANISM WITHIN BLOW MOLD HANGER AND RELATED METHODS AND BOTTLES

(71) Applicant: GRAHAM PACKAGING COMPANY, L.P., York, PA (US)

(72) Inventors: Stephen R. Guerin, Milford, NH (US); David P. Piccioli, Auburn, NH (US); Thomas E. Nahill, Amherst, NH (US); Keith J. Barker, Bedford, NH (US)

(73) Assignee: GRAHAM PACKAGING COMPANY, L.P., York, PA (US)

( * ) Notice: Subject to any disclaimer, the term of this patent is extended or adjusted under 35 U.S.C. 154(b) by 0 days.

(21) Appl. No.: 14/703,602

(22) Filed: May 4, 2015

(65) Prior Publication Data

US 2015/0306829 A1    Oct. 29, 2015

Related U.S. Application Data

(62) Division of application No. 13/841,745, filed on Mar. 15, 2013, now Pat. No. 9,022,776.

(51) Int. Cl.
*B29C 49/42* (2006.01)
*B29C 49/48* (2006.01)
(Continued)

(52) U.S. Cl.
CPC ......... *B29C 49/4802* (2013.01); *B29C 49/4815* (2013.01); *B29C 49/54* (2013.01);
(Continued)

(58) Field of Classification Search
CPC ................... B29C 49/4802; B29C 2049/4807; B29C 49/54; B29C 49/541
USPC ......................................... 425/522, 525, 541
See application file for complete search history.

(56) References Cited

U.S. PATENT DOCUMENTS

| 1,499,239 A | 6/1924 | Malmquist |
| D110,624 S | 7/1938 | Mekeel, Jr. |

(Continued)

FOREIGN PATENT DOCUMENTS

| AU | 2002257159 B2 | 3/2007 |
| CA | 2077717 A1 | 3/1993 |

(Continued)

OTHER PUBLICATIONS

Partial machine translation of DE 102008038781 A1 dated Feb. 11, 2010.*

(Continued)

*Primary Examiner* — Robert B Davis
(74) *Attorney, Agent, or Firm* — Baker Botts L.L.P.

(57) ABSTRACT

Disclosed is a mold hanger for supporting a bottle mold in a blow molding station, the mold hanger comprising a piston and piston sleeve fully contained within the mold hanger configured to push a moveable insert into the mold. Also disclosed is a method of retrofitting an original rotatable blow molding module having multiple existing blow molding stations, each existing mold hanger defining an existing outer envelope. The disclosed method may include providing an improved mold hanger substantially contained within the respective existing outer envelope and including low-profile drive mechanisms configured opposably to drive moveable inserts into the mold. Further disclosed is a method of manufacturing a blow molded bottle with a deep pinch grip, the method including providing within a mold hanger a drive mechanism to drive a moveable insert into the mold. A bottle made by such methods is also disclosed.

14 Claims, 10 Drawing Sheets

(51) Int. Cl.
B29D 22/00 (2006.01)
B65D 1/40 (2006.01)
B65D 23/10 (2006.01)
B29C 49/54 (2006.01)
B29L 31/00 (2006.01)
B29C 49/06 (2006.01)
B29C 49/36 (2006.01)

(52) U.S. Cl.
CPC .............. B29D 22/003 (2013.01); B65D 1/40 (2013.01); B65D 23/102 (2013.01); B29C 49/06 (2013.01); B29C 49/36 (2013.01); B29C 49/4236 (2013.01); B29C 49/541 (2013.01); B29C 2049/4807 (2013.01); B29L 2031/7158 (2013.01)

(56) References Cited

U.S. PATENT DOCUMENTS

| | | | |
|---|---|---|---|
| 2,124,959 | A | 7/1938 | Vogel |
| 2,142,257 | A | 1/1939 | Saeta |
| 2,378,324 | A | 6/1945 | Ray et al. |
| 2,880,902 | A | 4/1959 | Owsen |
| 2,960,248 | A | 11/1960 | Kuhlman |
| 2,971,671 | A | 2/1961 | Shakman |
| 2,982,440 | A | 5/1961 | Harrison |
| 3,043,461 | A | 7/1962 | Glassco |
| 3,081,002 | A | 3/1963 | Tauschinski et al. |
| 3,090,478 | A | 5/1963 | Stanley |
| 3,142,371 | A | 7/1964 | Rice et al. |
| 3,174,655 | A | 3/1965 | Hurschman |
| 3,198,861 | A | 8/1965 | Marvel |
| 3,201,111 | A | 8/1965 | Afton |
| 3,218,669 | A | 11/1965 | Barker |
| 3,301,293 | A | 1/1967 | Santelli |
| 3,325,031 | A | 6/1967 | Singier |
| 3,397,724 | A | 8/1968 | Bolen et al. |
| 3,409,167 | A | 11/1968 | Blanchard |
| 3,417,893 | A | 12/1968 | Lieberman |
| 3,426,939 | A | 2/1969 | Young |
| 3,441,982 | A | 5/1969 | Hiroshi et al. |
| 3,457,590 | A | 7/1969 | Dittmann |
| 3,468,443 | A | 9/1969 | Marcus |
| 3,483,908 | A | 12/1969 | Donovan |
| 3,485,355 | A | 12/1969 | Stewart |
| 3,693,828 | A | 9/1972 | Kneusel et al. |
| 3,704,140 | A | 11/1972 | Petit et al. |
| 3,727,783 | A | 4/1973 | Carmichael |
| 3,791,508 | A | 2/1974 | Osborne et al. |
| 3,819,789 | A | 6/1974 | Parker |
| 3,904,069 | A | 9/1975 | Toukmanian |
| 3,918,920 | A | 11/1975 | Barber |
| 3,928,522 | A | 12/1975 | Farrell |
| 3,935,955 | A | 2/1976 | Das |
| 3,941,237 | A | 3/1976 | MacGregor, Jr. |
| 3,942,673 | A | 3/1976 | Lyu et al. |
| 3,949,033 | A | 4/1976 | Uhlig |
| 3,956,441 | A | 5/1976 | Uhlig |
| 4,035,455 | A | 7/1977 | Rosenkranz et al. |
| 4,036,926 | A | 7/1977 | Chang |
| 4,037,752 | A | 7/1977 | Dulmaine et al. |
| 4,117,062 | A | 9/1978 | Uhlig |
| 4,123,217 | A | 10/1978 | Fischer et al. |
| 4,125,632 | A | 11/1978 | Vosti et al. |
| 4,134,510 | A | 1/1979 | Chang |
| 4,158,624 | A | 6/1979 | Ford et al. |
| 4,170,622 | A | 10/1979 | Uhlig |
| 4,174,782 | A | 11/1979 | Obsomer |
| 4,177,239 | A | 12/1979 | Gittner et al. |
| 4,219,137 | A | 8/1980 | Hutchens |
| 4,231,483 | A | 11/1980 | Dechenne et al. |
| 4,247,012 | A | 1/1981 | Alberghini |
| 4,301,933 | A | 11/1981 | Yoshino |
| 4,318,489 | A | 3/1982 | Snyder et al. |
| 4,318,882 | A | 3/1982 | Agrawal et al. |
| 4,338,765 | A | 7/1982 | Ohmori et al. |
| 4,355,728 | A | 10/1982 | Ota et al. |
| 4,377,191 | A | 3/1983 | Yamaquchi |
| 4,378,328 | A | 3/1983 | Przytulla et al. |
| 4,381,061 | A | 4/1983 | Cerny et al. |
| D269,158 | S | 5/1983 | Gaunt |
| 4,386,701 | A | 6/1983 | Galer |
| 4,436,216 | A | 3/1984 | Chang |
| 4,444,308 | A | 4/1984 | MacEwen |
| 4,450,878 | A | 5/1984 | Takada et al. |
| 4,465,199 | A | 8/1984 | Aoki |
| 4,495,974 | A | 1/1985 | Pohorski |
| 4,497,621 | A | 2/1985 | Kudert et al. |
| 4,497,855 | A | 2/1985 | Agrawal et al. |
| 4,525,401 | A | 6/1985 | Pocock et al. |
| 4,542,029 | A | 9/1985 | Caner et al. |
| 4,547,333 | A | 10/1985 | Takada |
| 4,585,158 | A | 4/1986 | Wardlaw, III |
| 4,610,366 | A | 9/1986 | Estes et al. |
| 4,628,669 | A | 12/1986 | Herron et al. |
| 4,642,968 | A | 2/1987 | McHenry et al. |
| 4,645,078 | A | 2/1987 | Reyner |
| 4,667,454 | A | 5/1987 | McHenry et al. |
| 4,684,025 | A | 8/1987 | Copland et al. |
| 4,685,273 | A | 8/1987 | Caner et al. |
| D292,378 | S | 10/1987 | Brandt et al. |
| 4,701,121 | A | 10/1987 | Jakobsen et al. |
| 4,723,661 | A | 2/1988 | Hoppmann et al. |
| 4,724,855 | A | 2/1988 | Jackson |
| 4,725,464 | A | 2/1988 | Collette |
| 4,747,507 | A | 5/1988 | Fitzgerald et al. |
| 4,749,092 | A | 6/1988 | Sugiura et al. |
| 4,769,206 | A | 9/1988 | Reymann et al. |
| 4,773,458 | A | 9/1988 | Touzani |
| 4,785,949 | A | 11/1988 | Krishnakumar et al. |
| 4,785,950 | A | 11/1988 | Miller et al. |
| 4,807,424 | A | 2/1989 | Robinson et al. |
| 4,813,556 | A | 3/1989 | Lawrence |
| 4,831,050 | A | 5/1989 | Cassidy et al. |
| 4,836,398 | A | 6/1989 | Leftault, Jr. et al. |
| 4,840,289 | A | 6/1989 | Fait et al. |
| 4,850,493 | A | 7/1989 | Howard, Jr. |
| 4,850,494 | A | 7/1989 | Howard, Jr. |
| 4,865,206 | A | 9/1989 | Behm et al. |
| 4,867,323 | A | 9/1989 | Powers |
| 4,880,129 | A | 11/1989 | McHenry et al. |
| 4,887,730 | A | 12/1989 | Touzani |
| 4,892,205 | A | 1/1990 | Powers et al. |
| 4,896,205 | A | 1/1990 | Weber |
| 4,921,147 | A | 5/1990 | Poirier |
| 4,927,679 | A | 5/1990 | Beck |
| 4,962,863 | A | 10/1990 | Wendlinq et al. |
| 4,967,538 | A | 11/1990 | Leftault, Jr. et al. |
| 4,978,015 | A | 12/1990 | Walker |
| 4,997,692 | A | 3/1991 | Yoshino |
| 5,004,109 | A | 4/1991 | Bartley et al. |
| 5,005,716 | A | 4/1991 | Eberle |
| 5,014,868 | A | 5/1991 | Wittig et al. |
| 5,020,691 | A | 6/1991 | Nye |
| 5,024,340 | A | 6/1991 | Alberghini et al. |
| 5,033,254 | A | 7/1991 | Zenger |
| 5,054,632 | A | 10/1991 | Alberghini et al. |
| 5,060,453 | A | 10/1991 | Alberghini et al. |
| 5,067,622 | A | 11/1991 | Garver et al. |
| 5,090,180 | A | 2/1992 | Sorensen |
| 5,092,474 | A | 3/1992 | Leigner |
| 5,122,327 | A | 6/1992 | Spina et al. |
| 5,133,468 | A | 7/1992 | Brunson et al. |
| 5,141,121 | A | 8/1992 | Brown et al. |
| 5,178,290 | A | 1/1993 | Ota et al. |
| 5,199,587 | A | 4/1993 | Ota et al. |
| 5,199,588 | A | 4/1993 | Hayashi |
| 5,201,438 | A | 4/1993 | Norwood |
| 5,217,737 | A | 6/1993 | Gygax et al. |
| 5,234,126 | A | 8/1993 | Jonas et al. |
| 5,244,106 | A | 9/1993 | Takacs |
| 5,251,424 | A | 10/1993 | Zenger et al. |
| 5,255,889 | A | 10/1993 | Collette et al. |

(56) References Cited

U.S. PATENT DOCUMENTS

| | | |
|---|---|---|
| 5,261,544 A | 11/1993 | Weaver, Jr. |
| 5,279,433 A | 1/1994 | Krishnakumar et al. |
| 5,281,387 A | 1/1994 | Collette et al. |
| 5,310,043 A | 5/1994 | Alcorn |
| 5,333,761 A | 8/1994 | Davis et al. |
| 5,337,909 A | 8/1994 | Vailliencourt |
| 5,337,924 A | 8/1994 | Dickie |
| 5,341,946 A | 8/1994 | Vailliencourt et al. |
| 5,389,332 A | 2/1995 | Amari et al. |
| 5,392,937 A | 2/1995 | Prevot et al. |
| 5,405,015 A | 4/1995 | Bhatia et al. |
| 5,407,086 A | 4/1995 | Ota et al. |
| 5,411,699 A | 5/1995 | Collette et al. |
| 5,454,481 A | 10/1995 | Hsu |
| 5,472,105 A | 12/1995 | Krishnakumar et al. |
| 5,472,181 A | 12/1995 | Lowell |
| RE35,140 E | 1/1996 | Powers, Jr. |
| 5,484,052 A | 1/1996 | Pawloski et al. |
| D366,831 S | 2/1996 | Semersky et al. |
| 5,492,245 A | 2/1996 | Kalkanis |
| 5,503,283 A | 4/1996 | Semersky |
| 5,543,107 A | 8/1996 | Malik et al. |
| 5,593,063 A | 1/1997 | Claydon et al. |
| 5,598,941 A | 2/1997 | Semersky et al. |
| 5,632,397 A | 5/1997 | Fandeux et al. |
| 5,642,826 A | 7/1997 | Melrose |
| 5,672,730 A | 9/1997 | Cottman |
| 5,687,874 A | 11/1997 | Omori et al. |
| 5,690,244 A | 11/1997 | Darr |
| 5,697,489 A | 12/1997 | Deonarine et al. |
| 5,704,504 A | 1/1998 | Bueno |
| 5,713,480 A | 2/1998 | Petre et al. |
| 5,718,030 A | 2/1998 | Langmack et al. |
| 5,730,314 A | 3/1998 | Wiemann et al. |
| 5,730,914 A | 3/1998 | Ruppman, Sr. |
| 5,735,420 A | 4/1998 | Nakamaki et al. |
| 5,737,827 A | 4/1998 | Kuse et al. |
| 5,758,802 A | 6/1998 | Wallays |
| 5,762,221 A | 6/1998 | Tobias et al. |
| 5,780,130 A | 7/1998 | Hansen et al. |
| 5,785,197 A | 7/1998 | Slat |
| 5,817,348 A | 10/1998 | Ikeda |
| 5,819,507 A | 10/1998 | Kaneko et al. |
| 5,829,614 A | 11/1998 | Collette et al. |
| 5,860,556 A | 1/1999 | Robbins, III |
| 5,887,739 A | 3/1999 | Prevot et al. |
| 5,888,598 A | 3/1999 | Brewster et al. |
| 5,897,090 A | 4/1999 | Smith et al. |
| 5,906,286 A | 5/1999 | Matsuno et al. |
| 5,908,128 A | 6/1999 | Krishnakumar et al. |
| D413,519 S | 9/1999 | Eberle et al. |
| D415,030 S | 10/1999 | Searle et al. |
| 5,971,184 A | 10/1999 | Krishnakumar et al. |
| 5,976,653 A | 11/1999 | Collette et al. |
| 5,989,661 A | 11/1999 | Krishnakumar et al. |
| 6,016,932 A | 1/2000 | Gaydosh et al. |
| RE36,639 E | 4/2000 | Okhai |
| 6,045,001 A | 4/2000 | Seul |
| 6,051,295 A | 4/2000 | Schloss et al. |
| 6,063,325 A | 5/2000 | Nahill et al. |
| 6,065,624 A | 5/2000 | Steinke |
| 6,068,110 A | 5/2000 | Kumakiri et al. |
| 6,074,596 A | 6/2000 | Jacquet |
| 6,077,554 A | 6/2000 | Wiemann et al. |
| 6,090,334 A | 7/2000 | Matsuno et al. |
| 6,105,815 A | 8/2000 | Mazda |
| 6,113,377 A | 9/2000 | Clark |
| D433,946 S | 11/2000 | Rollend et al. |
| 6,176,382 B1 | 1/2001 | Bazlur Rashid |
| D440,877 S | 4/2001 | Lichtman et al. |
| 6,209,710 B1 | 4/2001 | Mueller et al. |
| 6,213,325 B1 | 4/2001 | Cheng et al. |
| 6,217,818 B1 | 4/2001 | Collette et al. |
| 6,228,317 B1 | 5/2001 | Smith et al. |
| 6,230,912 B1 | 5/2001 | Rashid |
| 6,248,413 B1 | 6/2001 | Barel et al. |
| 6,253,809 B1 | 7/2001 | Paradies |
| 6,273,282 B1 | 8/2001 | Ogg et al. |
| 6,277,321 B1 | 8/2001 | Vailliencourt et al. |
| 6,298,638 B1 | 10/2001 | Bettle |
| D450,595 S | 11/2001 | Ogg et al. |
| 6,354,427 B1 | 3/2002 | Pickel et al. |
| 6,375,025 B1 | 4/2002 | Mooney |
| 6,390,316 B1 | 5/2002 | Mooney |
| 6,413,466 B1 | 7/2002 | Boyd et al. |
| 6,439,413 B1 | 8/2002 | Prevot et al. |
| 6,447,281 B1 | 9/2002 | Petre |
| 6,460,714 B1 | 10/2002 | Silvers et al. |
| 6,467,639 B2 | 10/2002 | Mooney |
| 6,485,669 B1 | 11/2002 | Boyd et al. |
| 6,494,333 B2 | 12/2002 | Sasaki et al. |
| 6,502,369 B1 | 1/2003 | Andison et al. |
| 6,514,451 B1 | 2/2003 | Boyd et al. |
| 6,585,123 B1 | 7/2003 | Pedmo et al. |
| 6,585,124 B2 | 7/2003 | Boyd et al. |
| 6,595,380 B2 | 7/2003 | Silvers |
| 6,612,451 B2 | 9/2003 | Tobias et al. |
| 6,615,472 B2 | 9/2003 | Petre |
| 6,635,217 B1 | 10/2003 | Britton |
| D482,976 S | 12/2003 | Melrose |
| 6,662,960 B2 | 12/2003 | Hong et al. |
| 6,676,883 B2 | 1/2004 | Hutchinson et al. |
| D492,201 S | 6/2004 | Pritchett et al. |
| 6,749,075 B2 | 6/2004 | Bourque et al. |
| 6,749,780 B2 | 6/2004 | Tobias |
| 6,763,968 B1 | 7/2004 | Boyd et al. |
| 6,763,969 B1 | 7/2004 | Melrose et al. |
| 6,769,561 B2 | 8/2004 | Futral et al. |
| 6,779,673 B2 | 8/2004 | Melrose et al. |
| 6,796,450 B2 | 9/2004 | Prevot et al. |
| 6,920,992 B2 | 7/2005 | Lane et al. |
| 6,923,334 B2 | 8/2005 | Melrose et al. |
| 6,929,138 B2 | 8/2005 | Melrose et al. |
| 6,932,230 B2 | 8/2005 | Pedmo et al. |
| 6,942,116 B2 | 9/2005 | Lisch et al. |
| 6,974,047 B2 | 12/2005 | Kelley et al. |
| 6,983,858 B2 | 1/2006 | Slat et al. |
| 7,051,073 B1 | 5/2006 | Dutta |
| 7,051,889 B2 | 5/2006 | Boukobza |
| D522,368 S | 6/2006 | Darr et al. |
| 7,073,675 B2 | 7/2006 | Trude |
| 7,077,279 B2 | 7/2006 | Melrose |
| 7,080,747 B2 | 7/2006 | Lane et al. |
| D531,910 S | 11/2006 | Melrose |
| 7,137,520 B1 | 11/2006 | Melrose |
| 7,140,505 B2 | 11/2006 | Roubal et al. |
| 7,150,372 B2 | 12/2006 | Lisch et al. |
| D535,884 S | 1/2007 | Davis et al. |
| 7,159,374 B2 | 1/2007 | Abercrombie, III et al. |
| D538,168 S | 3/2007 | Davis et al. |
| D547,664 S | 7/2007 | Davis et al. |
| 7,334,695 B2 | 2/2008 | Bysick et al. |
| 7,350,657 B2 | 4/2008 | Eaton et al. |
| D572,599 S | 7/2008 | Melrose |
| 7,416,089 B2 | 8/2008 | Kraft et al. |
| D576,041 S | 9/2008 | Melrose et al. |
| 7,451,886 B2 | 11/2008 | Lisch et al. |
| 7,543,713 B2 | 6/2009 | Trude et al. |
| 7,552,834 B2 | 6/2009 | Tanaka et al. |
| 7,574,846 B2 | 8/2009 | Sheets et al. |
| 7,694,842 B2 | 4/2010 | Melrose |
| 7,726,106 B2 | 6/2010 | Kelley et al. |
| 7,735,304 B2 | 6/2010 | Kelley et al. |
| 7,748,551 B2 | 7/2010 | Gatewood et al. |
| D623,952 S | 9/2010 | Yourist et al. |
| 7,799,264 B2 | 9/2010 | Trude |
| 7,882,971 B2 | 2/2011 | Kelley et al. |
| 7,900,425 B2 | 3/2011 | Bysick et al. |
| 7,926,243 B2 | 4/2011 | Kelley et al. |
| D637,495 S | 5/2011 | Gill et al. |
| D637,913 S | 5/2011 | Schlies et al. |
| D641,244 S | 7/2011 | Bysick et al. |
| 7,980,404 B2 | 7/2011 | Trude et al. |
| 8,011,166 B2 | 9/2011 | Sheets et al. |

(56) References Cited

U.S. PATENT DOCUMENTS

| | | | |
|---|---|---|---|
| 8,017,065 | B2 | 9/2011 | Trude et al. |
| D646,966 | S | 10/2011 | Gill et al. |
| 8,028,498 | B2 | 10/2011 | Melrose |
| 8,075,833 | B2 | 12/2011 | Kelley |
| D653,119 | S | 1/2012 | Hunter et al. |
| 8,096,098 | B2 | 1/2012 | Kelley et al. |
| D653,550 | S | 2/2012 | Hunter |
| D653,957 | S | 2/2012 | Yourist et al. |
| 8,162,655 | B2 | 4/2012 | Trude et al. |
| 8,171,701 | B2 | 5/2012 | Kelley et al. |
| 8,235,704 | B2 | 8/2012 | Kelley |
| 8,323,555 | B2 | 12/2012 | Trude et al. |
| 8,827,689 | B2 * | 9/2014 | Briard ............... B29C 49/4802 425/161 |
| 9,022,776 | B2 | 5/2015 | Guerin et al. |
| 2001/0035391 | A1 | 11/2001 | Young et al. |
| 2001/0051192 | A1 | 12/2001 | Petre |
| 2002/0063105 | A1 | 5/2002 | Darr et al. |
| 2002/0074336 | A1 | 6/2002 | Silvers |
| 2002/0096486 | A1 | 7/2002 | Bourquet et al. |
| 2002/0153343 | A1 | 10/2002 | Tobias et al. |
| 2002/0158038 | A1 | 10/2002 | Heisel et al. |
| 2003/0015491 | A1 | 1/2003 | Melrose et al. |
| 2003/0186006 | A1 | 10/2003 | Schmidt et al. |
| 2003/0196926 | A1 | 10/2003 | Tobias et al. |
| 2003/0205550 | A1 | 11/2003 | Prevot et al. |
| 2003/0217947 | A1 | 11/2003 | Ishikata et al. |
| 2004/0000533 | A1 | 1/2004 | Kamineni et al. |
| 2004/0016716 | A1 | 1/2004 | Melrose et al. |
| 2004/0074864 | A1 | 4/2004 | Melrose et al. |
| 2004/0129669 | A1 | 7/2004 | Kelley et al. |
| 2004/0149677 | A1 | 8/2004 | Slat et al. |
| 2004/0173565 | A1 | 9/2004 | Semersky et al. |
| 2004/0211746 | A1 | 10/2004 | Trude |
| 2004/0232103 | A1 | 11/2004 | Lisch et al. |
| 2005/0035083 | A1 | 2/2005 | Pedmo et al. |
| 2005/0211662 | A1 | 9/2005 | Eaton et al. |
| 2005/0218108 | A1 | 10/2005 | Banqi et al. |
| 2006/0006133 | A1 | 1/2006 | Lisch et al. |
| 2006/0051541 | A1 | 3/2006 | Steele |
| 2006/0138074 | A1 | 6/2006 | Melrose |
| 2006/0151425 | A1 | 7/2006 | Kelley et al. |
| 2006/0231985 | A1 | 10/2006 | Kelley |
| 2006/0243698 | A1 | 11/2006 | Melrose |
| 2006/0255005 | A1 | 11/2006 | Melrose et al. |
| 2006/0261031 | A1 | 11/2006 | Melrose |
| 2007/0017892 | A1 | 1/2007 | Melrose |
| 2007/0045222 | A1 | 3/2007 | Denner et al. |
| 2007/0045312 | A1 | 3/2007 | Abercrombie, III et al. |
| 2007/0051073 | A1 | 3/2007 | Kelley et al. |
| 2007/0084821 | A1 | 4/2007 | Bysick et al. |
| 2007/0125742 | A1 | 6/2007 | Simpson, Jr. et al. |
| 2007/0125743 | A1 | 6/2007 | Pritchett, Jr. et al. |
| 2007/0131644 | A1 | 6/2007 | Melrose |
| 2007/0145646 | A1 | 6/2007 | Cho |
| 2007/0181403 | A1 | 8/2007 | Sheets et al. |
| 2007/0199915 | A1 | 8/2007 | Denner et al. |
| 2007/0199916 | A1 | 8/2007 | Denner et al. |
| 2007/0215571 | A1 | 9/2007 | Trude |
| 2007/0235905 | A1 | 10/2007 | Trude et al. |
| 2008/0029475 | A1 * | 2/2008 | Scarola ............... B65D 23/102 215/398 |
| 2008/0047964 | A1 | 2/2008 | Denner et al. |
| 2008/0156847 | A1 | 7/2008 | Hawk et al. |
| 2008/0257858 | A1 | 10/2008 | Abrahamsson et al. |
| 2009/0090728 | A1 | 4/2009 | Trude et al. |
| 2009/0091067 | A1 | 4/2009 | Trude et al. |
| 2009/0092720 | A1 | 4/2009 | Trude et al. |
| 2009/0120530 | A1 | 5/2009 | Kelley et al. |
| 2009/0134117 | A1 | 5/2009 | Mooney |
| 2009/0139996 | A1 * | 6/2009 | Jacson ............... B29C 49/4802 220/771 |
| 2009/0202766 | A1 | 8/2009 | Beuerle et al. |
| 2009/0236776 | A1 | 9/2009 | Connolly et al. |
| 2009/0293436 | A1 | 12/2009 | Miyazaki et al. |
| 2010/0018838 | A1 | 1/2010 | Kelley et al. |
| 2010/0116778 | A1 | 5/2010 | Melrose |
| 2010/0133228 | A1 | 6/2010 | Trude |
| 2010/0163513 | A1 | 7/2010 | Pedmo |
| 2010/0170199 | A1 | 7/2010 | Kelley et al. |
| 2010/0213204 | A1 | 8/2010 | Melrose |
| 2010/0237083 | A1 | 9/2010 | Trude et al. |
| 2010/0301058 | A1 | 12/2010 | Trude et al. |
| 2011/0024952 | A1 | 2/2011 | Stoiber et al. |
| 2011/0049083 | A1 | 3/2011 | Scott et al. |
| 2011/0049084 | A1 | 3/2011 | Yourist et al. |
| 2011/0057361 | A1 | 3/2011 | Gerlach et al. |
| 2011/0084046 | A1 | 4/2011 | Schlies et al. |
| 2011/0094618 | A1 | 4/2011 | Melrose |
| 2011/0108515 | A1 | 5/2011 | Gill et al. |
| 2011/0113731 | A1 | 5/2011 | Bysick et al. |
| 2011/0132865 | A1 | 6/2011 | Hunter et al. |
| 2011/0147392 | A1 | 6/2011 | Trude et al. |
| 2011/0210133 | A1 | 9/2011 | Melrose et al. |
| 2011/0266293 | A1 | 11/2011 | Kelley et al. |
| 2011/0284493 | A1 | 11/2011 | Yourist et al. |
| 2011/0298162 | A1 | 12/2011 | Chomel et al. |
| 2012/0104010 | A1 | 5/2012 | Kelley |
| 2012/0107541 | A1 | 5/2012 | Nahill et al. |
| 2012/0132611 | A1 | 5/2012 | Trude et al. |
| 2012/0152964 | A1 | 6/2012 | Kelley et al. |
| 2012/0240515 | A1 | 9/2012 | Kelley et al. |
| 2012/0266565 | A1 | 10/2012 | Trude et al. |
| 2012/0267381 | A1 | 10/2012 | Trude et al. |
| 2013/0000259 | A1 | 1/2013 | Trude et al. |
| 2014/0263160 | A1 | 9/2014 | Guerin et al. |

FOREIGN PATENT DOCUMENTS

| | | | |
|---|---|---|---|
| DE | 1176829 B | 8/1964 | |
| DE | 1761753 | 1/1972 | |
| DE | P2102319.8 | 8/1972 | |
| DE | 3215866 A 1 | 11/1983 | |
| DE | 102008038781 A1 * | 2/2010 | ......... B29C 49/4802 |
| EP | 0 225 155 A2 | 6/1987 | |
| EP | 0 346 518 | 12/1989 | |
| EP | 346518 A1 | 12/1989 | |
| EP | 0 502 391 A2 | 9/1992 | |
| EP | 0 505054 A 1 | 9/1992 | |
| EP | 0521642 A | 1/1993 | |
| EP | 0 551 788 A1 | 7/1993 | |
| EP | 0666222 A 1 | 2/1994 | |
| EP | 0 739 703 | 10/1996 | |
| EP | 0 609 348 B1 | 1/1997 | |
| EP | 0916406 A2 | 5/1999 | |
| EP | 0957030 A2 | 11/1999 | |
| EP | 1 063 076 A1 | 12/2000 | |
| FR | 1571499 | 6/1969 | |
| FR | 2607109 | 5/1988 | |
| GB | 781103 | 8/1957 | |
| GB | 1113988 | 5/1968 | |
| GB | 2050919 A | 1/1981 | |
| GB | 2372977 A | 9/2002 | |
| JP | S40/15909 | 6/1940 | |
| JP | 48/31050 | 9/1973 | |
| JP | 49/28628 | 7/1974 | |
| JP | 54/72181 A | 6/1979 | |
| JP | S54/70185 | 6/1979 | |
| JP | 35656830 A | 5/1981 | |
| JP | S56/62911 | 5/1981 | |
| JP | 56/72730 U | 6/1981 | |
| JP | S57/17730 | 1/1982 | |
| JP | 57/37827 | 2/1982 | |
| JP | 57/37827 U | 2/1982 | |
| JP | 57/126310 | 8/1982 | |
| JP | 57/210829 A | 12/1982 | |
| JP | 58/055005 | 4/1983 | |
| JP | 61/192539 A | 8/1986 | |
| JP | 63/189224 A | 8/1988 | |
| JP | 64/004662 | 2/1989 | |
| JP | 3/43342 | 2/1991 | |
| JP | 3/43342 A | 2/1991 | |
| JP | 03/076625 | 4/1991 | |
| JP | 4/10012 | 1/1992 | |

(56) References Cited

FOREIGN PATENT DOCUMENTS

| | | |
|---|---|---|
| JP | 5/193694 | 8/1993 |
| JP | 53/10239 A | 11/1993 |
| JP | H05/81009 | 11/1993 |
| JP | 06/270235 A | 9/1994 |
| JP | 6/336238 A | 12/1994 |
| JP | 07/300121 A | 11/1995 |
| JP | H08/048322 | 2/1996 |
| JP | 08/244747 A | 9/1996 |
| JP | 8/253220 A | 10/1996 |
| JP | 8/282633 A | 10/1996 |
| JP | 09/039934 A | 2/1997 |
| JP | 9/110045 A | 4/1997 |
| JP | 10/167226 A | 6/1998 |
| JP | 10/181734 A | 7/1998 |
| JP | 10/230919 A | 9/1998 |
| JP | 3056271 | 11/1998 |
| JP | 11/218537 A | 8/1999 |
| JP | 2000/229615 A | 8/2000 |
| JP | 2002/127237 A | 5/2002 |
| JP | 2002/160717 A | 6/2002 |
| JP | 2002/326618 A | 11/2002 |
| JP | 2003/095238 | 4/2003 |
| JP | 2004/026307 A | 1/2004 |
| JP | 2006/501109 | 1/2006 |
| JP | 2007/216981 A | 8/2007 |
| JP | 2008/189721 A | 8/2008 |
| JP | 2009/001639 A | 1/2009 |
| NZ | 296014 | 10/1998 |
| NZ | 335565 | 10/1999 |
| NZ | 506684 | 9/2001 |
| NZ | 512423 | 9/2001 |
| NZ | 521694 | 10/2003 |
| NZ | 240448 | 9/2009 |
| WO | WO 93/09031 A1 | 5/1993 |
| WO | WO 93/12975 A1 | 7/1993 |
| WO | WO 94/05555 | 3/1994 |
| WO | WO 94/06617 | 3/1994 |
| WO | WO 97/03885 | 2/1997 |
| WO | WO 97/14617 | 4/1997 |
| WO | WO 97/34808 | 9/1997 |
| WO | WO 97/34808 A1 | 9/1997 |
| WO | WO 99/21770 | 5/1999 |
| WO | WO 00/38902 A1 | 7/2000 |
| WO | WO 00/51895 A1 | 9/2000 |
| WO | WO 01/12531 A1 | 2/2001 |
| WO | WO 01/40081 A1 | 6/2001 |
| WO | WO 01/74689 A1 | 10/2001 |
| WO | WO 02/02418 A1 | 1/2002 |
| WO | WO 02/18213 A1 | 3/2002 |
| WO | WO 02/085755 | 10/2002 |
| WO | WO 2004/028910 A1 | 4/2004 |
| WO | WO 2004/106175 A1 | 12/2004 |
| WO | WO 2004/106176 A2 | 12/2004 |
| WO | WO 2005/012091 A2 | 2/2005 |
| WO | WO 2005/025999 A1 | 3/2005 |
| WO | WO 2005/087628 A1 | 9/2005 |
| WO | WO 2006/113428 A2 | 10/2006 |
| WO | WO 2007/047574 A1 | 4/2007 |
| WO | WO 2007/127337 A2 | 11/2007 |
| WO | WO 2010/058098 A2 | 5/2010 |

OTHER PUBLICATIONS

U.S. Appl. No. 13/210,350, filed Aug. 15, 2011, Wurster, et al.
U.S. Appl. No. 13/210,358, filed Aug. 15, 2011, Wurster, et al.
U.S. Appl. No. 13/251,966, filed Oct. 3, 2011, Howell, et al.
U.S. Appl. No. 13/410,902, filed Mar. 2, 2012, Gill.
U.S. Appl. No. 13/841,745, Sep. 15, 2014 Non-Final Office Action.
U.S. Appl. No. 13/841,745, Dec. 4, 2014 Response to Non-Final Office Action.
U.S. Appl. No. 13/841,745, Jan. 2, 2015 Notice of Allowance.
U.S. Appl. No. 13/841,745, Jan. 12, 2015 Applicant Initiated Interview Summary.
U.S. Appl. No. 13/841,745, Apr. 2, 2015 Issue Fee Payment.
U.S. Appl. No. 13/841,566, Jun. 22, 2015 Non-Final Office Action.
U.S. Appl. No. 13/841,566, Sep. 22, 2015 Response to Non-Final Office Action.
U.S. Appl. No. 13/841,566, Sep. 30, 2015 Notice of Allowance.
Application and Development of PET Plastic Bottle, Publication of Tsinghad Tongfang Optical Disc Co. Ltd., Issue 4, 2000, p. 41. (No English language translation available).
Australian Office Action dated Mar. 3, 2011 in Application No. 2010246525.
Australian Office Action dated Nov. 8, 2011, in Application No. 2011205106.
Chanda, M. & Roy, Salil K., Plastics Technology Handbook, Fourth Edition, 2007, CRC Press, Taylor & Francis Group, pp. 2-24-2-37.
Communication dated Jun. 16, 2006, for European Application No. 04779595.0.
Communication dated Mar. 9, 2010 for European Application No. 09 173 607.4 enclosing European search report and European search opinion dated Feb. 25, 2010.
Certified copy of the file wrapper and contents of U.S. Appl. No. 60/220,326, filed Jul. 24, 2000, dated Oct. 29, 2008.
European Search Report for EPA 10185697.9 dated Mar. 21, 2011.
Examination Report dated Jul. 25, 2012, in New Zealand Patent Application No. 593486.
Examination Report for counterpart New Zealand Application No. 545528 dated Jul. 1, 2008.
Examination Report for counterpart New Zealand Application No. 545528 dated Sep. 20, 2007.
Examination Report for counterpart New Zealand Application No. 569422 dated Jul. 1, 2008.
Examination Report for counterpart New Zealand Application No. 569422 dated Sep. 29, 2009.
Examination Report for New Zealand Application No. 550336 dated Mar. 26, 2009.
Examination Report for New Zealand Application No. 563134 dated Aug. 3, 2009.
Examiner Report dated Jul. 23, 2010, in Australian Application No. 2004261654.
Examiner Report dated May 26, 2010, in Australian Application No. 2004261654.
Examiner's Report dated Feb. 15, 2011 in Australian Application No. AU200630483.
Examiner's Report for Australian Application No. 200623667 4 dated Sep. 18, 2009.
Examiner's Report for Australian Application No. 2006236674 dated Nov. 6, 2009.
Extended European Search Report for EPA 10185697.9 dated Jul. 6, 2011.
Final Official Notification dated Mar. 23, 2010 for Japanese Application No. 2006-522084.
International Preliminary Report on Patentability and Written Opinion dated Jun. 14, 2011 for PCT/US2009/066191. 7 pages.
International Search Report and Written Opinion dated Dec. 18, 2012, in PCT/US12/056330.
International Search Report and Written Opinion dated Mar. 15, 2010 for PCT/US2010/020045.
International Search Report and Written Opinion dated Sep. 8, 2009 for PCT/US2009/051023.
International Search Report and Written Opinion for PCT /US2004/016405 dated Feb. 15, 2005.
International Search Report and Written Opinion for PCT /US2012/050256 dated Dec. 6, 2012.
International Search Report and Written Opinion for PCT/US2007/006318 dated Sep. 11, 2007.
International Search Report and Written Opinion for PCT/US2012/050251 dated Nov. 16, 2012.
International Search Report and Written Opinion for PCT/US2014/014783, dated May 23, 2014.
International Search Report and Written Opinion for PCT/US2014/017581, dated Jun. 10, 2014.
International Search report dated Apr. 21, 2010 from corresponding PCT/US2009/066191 filed Dec. 1, 2009.

(56) References Cited

OTHER PUBLICATIONS

International Search Report for PCT/US2004/024581 dated Jul. 25, 2005.
International Search Report for PCT/US2005/008374 dated Aug. 2, 2005.
International Search Report for PCT/US2006/014055 dated Aug. 24, 2006.
International Search Report for PCT/US2006/014055 dated Dec. 7, 2006.
International Search Report for PCT/US2006/040361 dated Feb. 26, 2007.
IPRP (including Written Opinion) for PCT/US2004/024581 dated Jan. 30, 2006.
IPRP (including Written Opinion) for PCT/US2005/008374 dated Sep. 13, 2006.
IPRP (including Written Opinion) for PCT/US2006/040361 dated Apr. 16, 2008.
IPRP (including Written Opinion) PCT/US2006/014055 dated Oct. 16, 2007.
IRRP (including Written Opinion) for PCT/US2007/006318 dated Sep. 16, 2008.
IRRP for PCT/US2004/016405 dated Nov. 25, 2005.
Japanese First Notice of Reasons for Rejection dated Aug. 23, 2011, in Application No. 2008-506738.
Japanese Second Notice of Reasons for Rejection dated Jun. 11, 2012, in Application No. 2008-506738.
Office Action dated Aug. 14, 2012, in Japanese Patent Application No. 2008-535769.
Office Action dated Dec. 6, 2011, in Japanese Patent Application No. 2008-535769.
Office Action dated Feb. 3, 2010 for Canadian Application No. 2,604,231.
Office Action dated Feb. 5, 2013, in Mexican Patent Application No. MX/a/2008/004703.
Office Action dated Jul. 19, 2011, in Japanese Patent Application No. 2008-535769.
Office Action dated Jul. 26, 2010 for Canadian Application No. 2,527,001.
Office Action dated Oct. 31, 2011, in Australian Patent Application No. 2011203263.
Office Action for Application No. EP 06 750 165.0-2307 dated Nov. 24, 2008.
Office Action for Chinese Application No. 200680012360.7 dated Jul. 10, 2009.
Office Action for Chinese Application No. 2006800380748 dated Jul. 10, 2009.
Office Action for European Application No. 07752979.0-2307 dated Aug. 21, 2009.
Office Action, Japanese Application No. 2008-506738 dated Aug. 23, 2011.
Official Notification for counterpart Japanese Application No. 2006-522084 dated May 19, 2009.
Patent Abstracts of Japan, vol. 012, No. 464; Dec. 6, 1988.
Patent Abstracts of Japan, vol. 015, No. 239, Jun. 20, 1991.
Patent Abstracts of Japan, vol. 2002, No. 09, Sep. 4, 2002.
Requisition dated Feb. 3, 2010 for Canadian Application No. 2,604,231.
Requisition dated Jan. 9, 2013 for Canadian Application No. 2,559,319.
Requisition dated May 25, 2010 for Canadian Application No. 2,534,266.
Sidel. SBO DC 16/SBO 18/SBO (Series 2) Machine Description Manual; Mar. 1, 2000 [retrieved on May 7, 2014] Retrieved from Internet: URL: http://www.go-dove.com/auctions/Auction16623/Sidel.pdf.
Taiwanese Office Action dated Jun. 10, 2012, Application No. 095113450.
Trial Decision dated Mar. 26, 2013 in Japanese Patent Application No. 2008-535759.

* cited by examiner

DEEP GRIP MECHANISM WITHIN BLOW MOLD HANGER AND RELATED METHODS AND BOTTLES

CROSS-REFERENCE TO RELATED APPLICATIONS

This application is a divisional of U.S. application Ser. No. 13/841,745, filed on Mar. 15, 2013, the content of which is hereby incorporated by reference in its entirety.

BACKGROUND

The present invention relates generally to blow molding containers, and more particularly to using moveable inserts to mold a deep-grip bottle, for example.

A prior art arrangement 102 for blow molding containers is shown in FIG. 1. A rotatable blow molding module 110 may have sixteen blow molding stations 12, for example. This may be a known Sidel-type SB0-16 GUPM module. The arrangement may include heating module 104, transfer module 106, and transfer module 108. The horizontal dimensions of a given blow molding module 12 define a space envelope 99.

In another prior art arrangement shown in FIG. 12, a rotatable blow molding module may have ten blow molding stations 12. This may be a known Sidel-type SB0-10 GUPM module.

In the prior art arrangements, each blow molding station 12 may include a mold 16 supported by a mold hanger 14, as depicted in FIG. 2. The mold may include cavity 345 for forming bottle 24 with grip 39. The blow molding station 12 may open in two halves 13. The mold may have a bottom 47 that needs to move downward to release bottle 24 at exit station 101 depicted in FIG. 12.

SUMMARY

As embodied herein, the present disclosure is directed to methods of retrofitting an original rotatable blow molding module having multiple existing blow molding stations affixed to the rotatable blow molding module, each existing blow molding station having an existing mold hanger for supporting and encasing a mold for a bottle, each existing mold hanger defining an existing outer envelope, the method comprising: providing in each blow molding station an improved mold hanger, the improved mold hanger substantially contained within the respective existing outer envelope and configured to support and encase a mold for blow molding a bottle from plastic; and providing in each improved mold hanger a pair of low-profile drive mechanisms configured to opposably drive a respective pair of moveable inserts at least one half inch into a cavity of the mold while the plastic is molten.

As embodied herein, the present disclosure is directed to methods of manufacturing a blow molded bottle with a deep pinch grip comprising: providing a mold hanger defining an outer envelope; providing in the mold hanger a mold with a cavity configured to receive molten plastic; providing within the outer envelope a first moveable insert; providing within the outer envelope a second moveable insert; providing within the mold hanger a first drive mechanism configured to drive the first moveable insert in a first direction into the cavity; providing within the mold hanger a second drive mechanism configured to drive the second moveable insert in a second direction into the cavity, the second direction being generally opposed to the first direction; blowing molten plastic into contact with the mold; and after blowing the molten plastic into contact with the mold, operating the first and second drive mechanisms to drive the first and second moveable inserts into the cavity while the plastic is still pliable and form a blow-molded bottle with a deep pinch grip, and to blow-molded bottles manufactured according to such methods.

DETAILED DESCRIPTION

Figure 1:
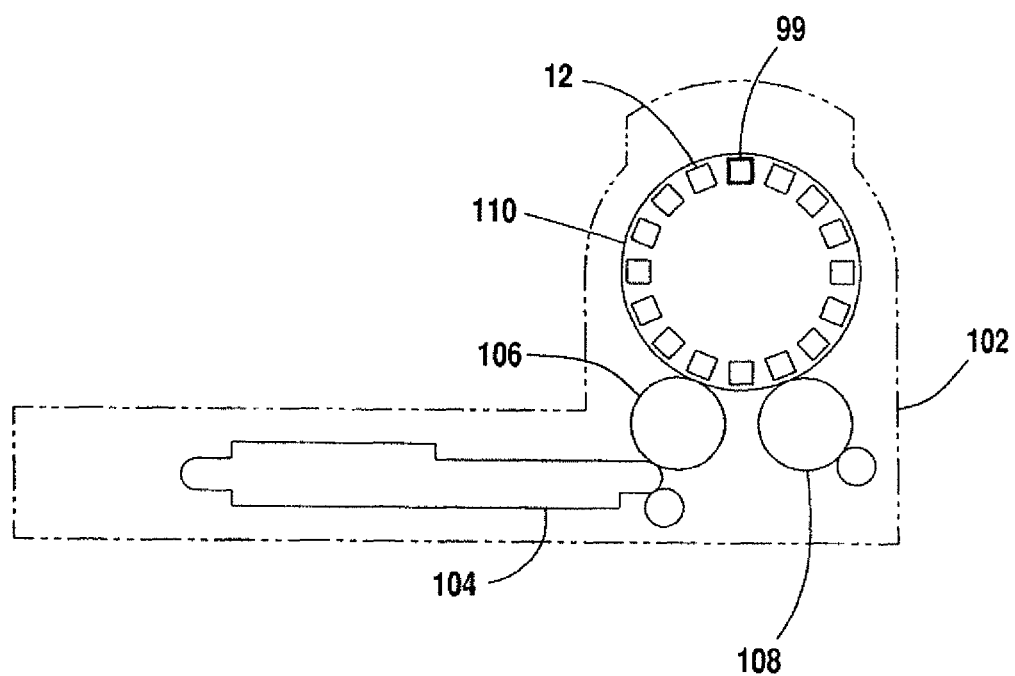
FIG. 1 is a diagram of a prior art arrangement for blow molding containers.
Figure 2:
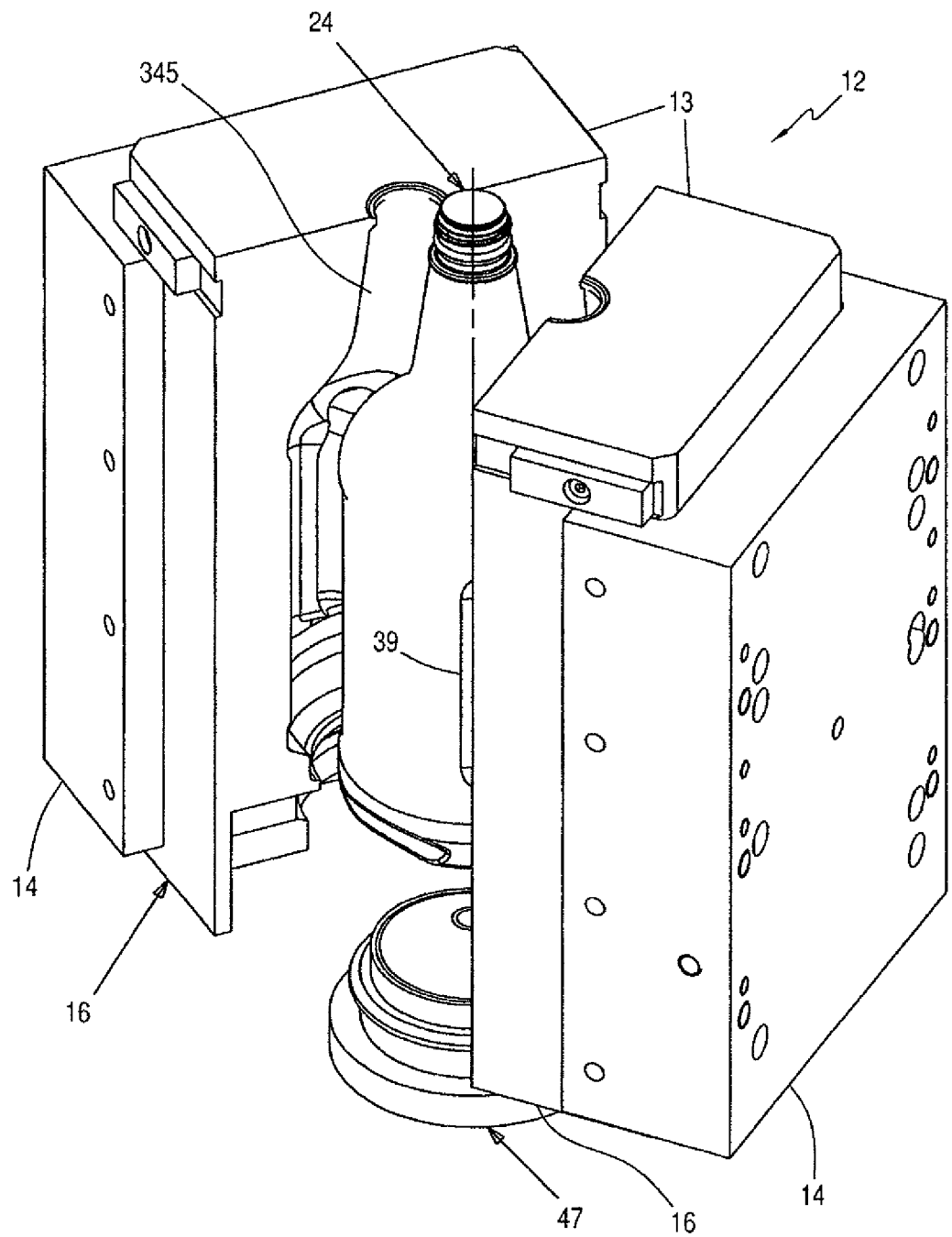
FIG. 2 is a perspective view of part of a prior art blow molding station.

Under a cooperative research and development agreement, it has been suggested to the present inventors to provide moveable inserts or slides in a mold to provide a grip deeper than the grip 39 provided by the conventional arrangement shown in FIG. 2. The moveable inserts would move into the mold toward the end of the blowing process, but while the plastic was still malleable. The inventors have recognized that providing for moveable inserts in a low profile manner will permit the moveable inserts to be used in a conventional rotatable blow molding module where space is limited. This preserves a favorable production rate and efficiency of existing arrangements, such as the ten station rotatable blow molding module depicted in FIG. 12 and the sixteen station rotatable blow molding module 110 depicted in FIG. 1. Providing and actuating moveable inserts in the low profile manner as described herein obviates the need to use fewer stations on a given rotatable blow molding module or the need to increase the size of the rotatable blow molding module which would otherwise be necessary if lateral space envelope 99 of each blow molding station were significantly enlarged.

Figure 12:
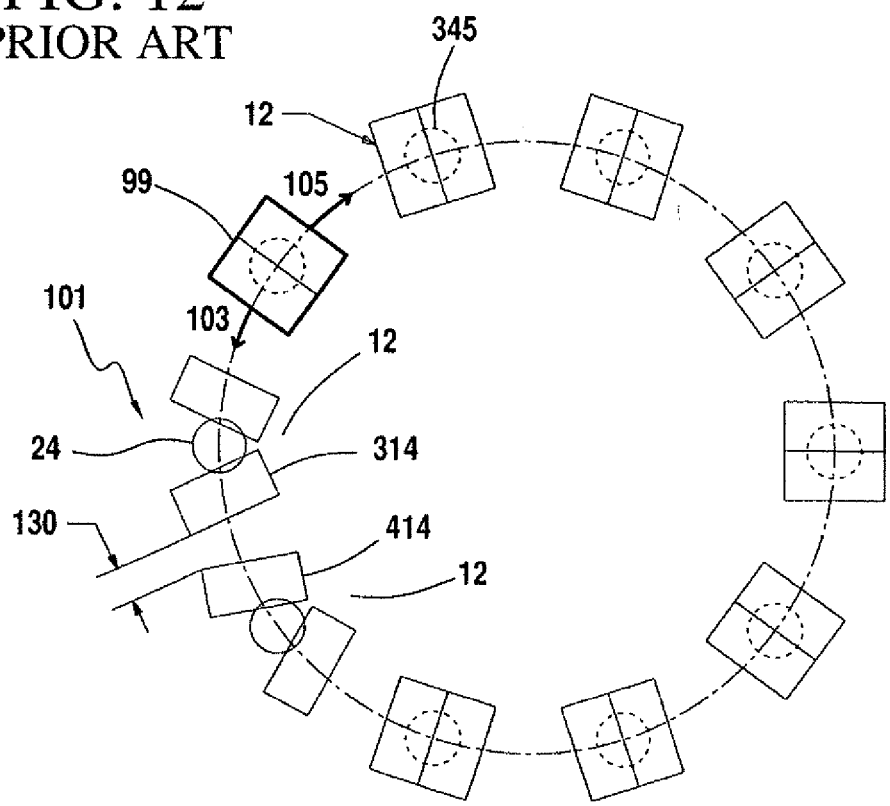
FIG. 12 is a diagram of a prior art module with blow molding stations for blow molding containers.

In a conventional ten station rotatable blow molding module as depicted in FIG. 12, finished bottle 24 is ejected at an ejection station 101 having a certain clearance 130 between an open mold hanger 314 in one existing blow molding station 12 and an open mold hanger 414 in an identical adjacent existing blow molding station 12. The outer envelope 99 of each mold hanger 314 and 414 of each existing blow molding station 12 cannot be increased by more than the clearance distance 130. In other words, the increase in lateral direction 103 and the increase in lateral direction 105 cannot together total more than clearance distance 130. Otherwise, mold hangers 314 and 414 would collide when they are opened at the ejection station. Preferably, the total increase of outer envelope 99 is significantly less than clearance distance 130. This allows for clearance distance 130 to be at least as large as a desired safety margin allowing for machining tolerances, positioning tolerances, hoses possibly getting positioned between adjacent hangers, and other safety considerations.

For a typical Sidel-type ten station rotatable blow molding module, e.g. Sidel SB0-10 GUPM, clearance 130 may be 66 millimeters. In that case, the desired safety margin may be 25 millimeters, permitting the total increase of outer envelope to be equal to, or preferably less than, 41 millimeters. All of the various inventive mechanisms described herein can easily be installed in each blow molding station while adding no more than 26 millimeters to the outer envelope 99. With further refinements, such as for example using stronger (and therefore thinner) metal in the mold hanger, the inventive drive mechanisms described herein may be added to an existing blow molding station 12 without causing the improved blow molding station to extend laterally beyond outer envelope 99.

Use of moveable inserts at various stages of a blow molding process is depicted in FIGS. 5 through 9.

Figure 5:
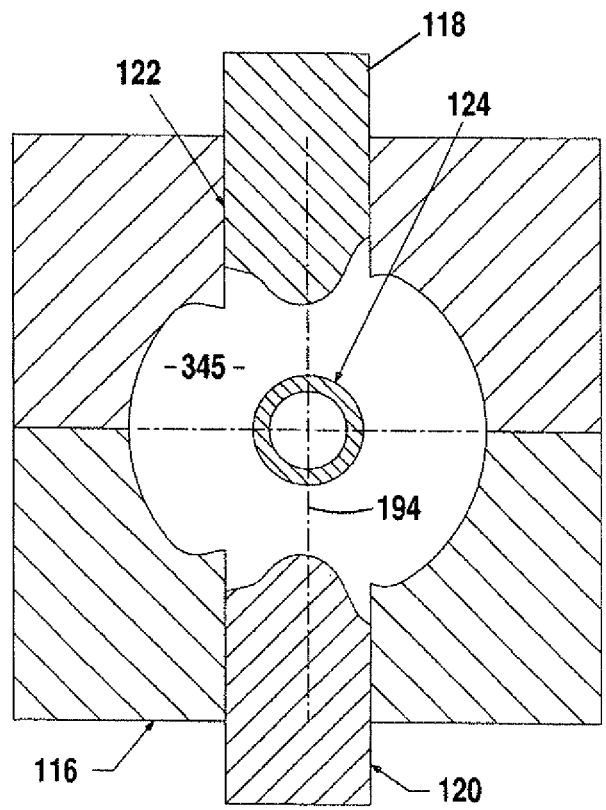
FIG. 5 is a cross-sectional view of an inventive mold with moveable inserts at a first stage.

FIG. 5 is a cross-section of a mold at a first stage. Here, preform 124 is shown centered on axis 194 of cavity 345 in mold 116. Moveable inserts 118 and 120 are shown in their outward or fully retracted position. Moveable insert 118 is slideably engaged in moveable insert pocket 122.

Figure 6:
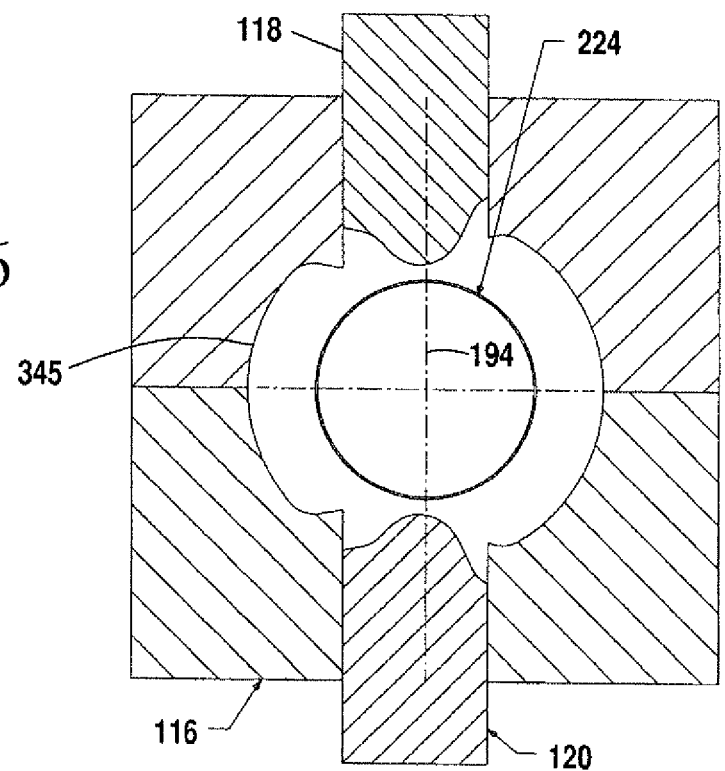
FIG. 6 is a cross-sectional view of the mold of FIG. 5 shown at a second stage.

FIG. 6 is a cross-sectional view of the mold of FIG. 5 shown at a second stage. By this time, preform 124 has been blown somewhat outward to intermediate form 224.

Figure 7:
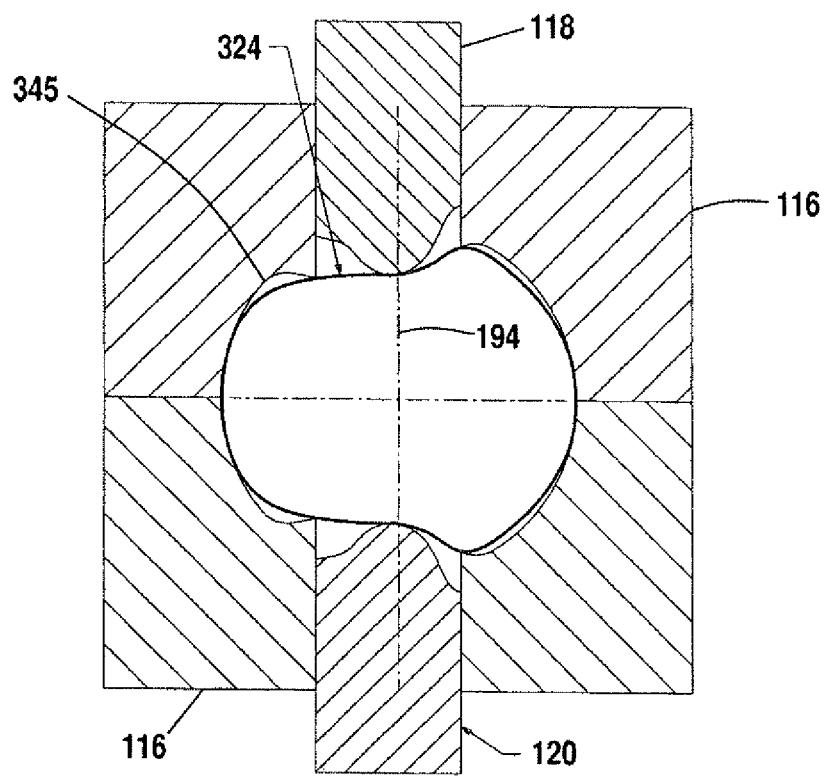
FIG. 7 is a cross-sectional view of the mold of FIG. 5 shown at a third stage.

FIG. 7 is a cross-sectional view of the mold of FIG. 5 shown at a third stage. By this time, intermediate form 224 has expanded to pre-shape 324 in partial contact with cavity 345.

Figure 8:
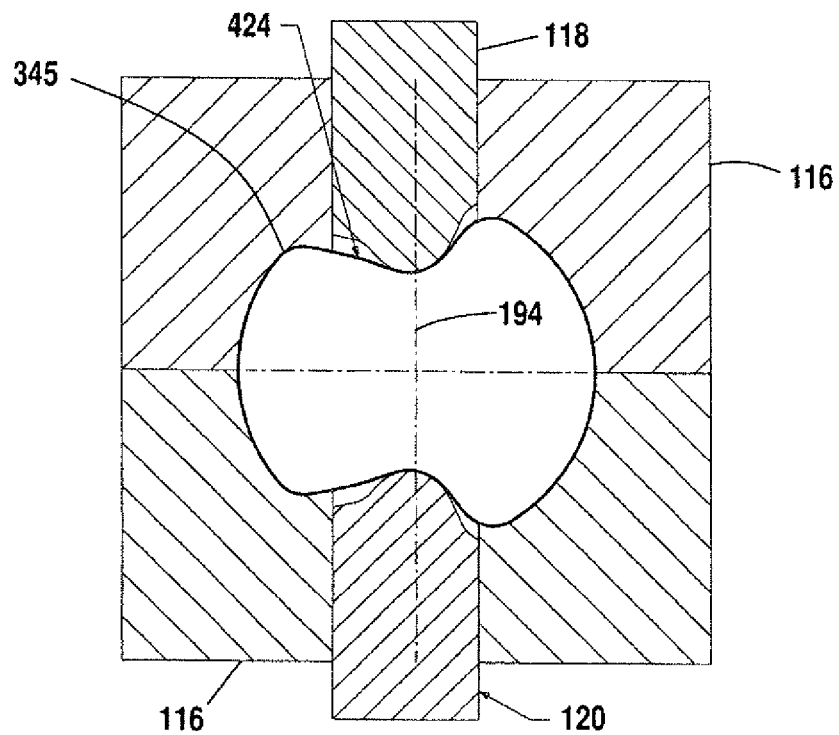
FIG. 8 is a cross-sectional view of the mold of FIG. 5 shown at a fourth stage.

FIG. 8 is a cross-sectional view of the mold of FIG. 5 shown at a fourth stage. By this time, pre-shape 324 has expanded to initial shape 424 in substantially full contact with cavity 345. Such contact may cause initial shape 424 to start cooling and hardening slightly.

Figure 9:
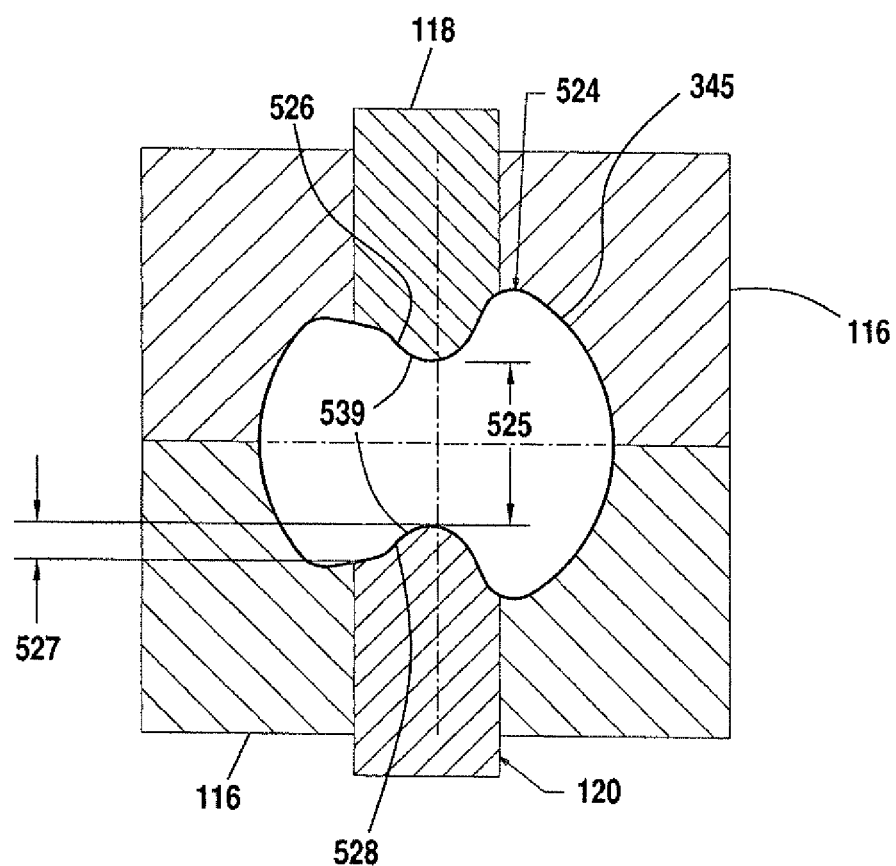
FIG. 9 is a cross-sectional view of the mold of FIG. 5 shown at a fifth stage.

FIG. 9 is a cross-sectional view of the mold of FIG. 5 shown at a fifth stage. Shortly after the stage shown in FIG. 8, moveable inserts 118 and 120 will advance into cavity 345 before initial shape 424 significantly hardens. Moveable inserts 118 and 120 are shown in FIG. 9 having moved to their inward or fully engaged position. The movement of moveable inserts 118 form their outward position to their inward position while the plastic is still molten moves the shallow grip in initial shape 424 into a deep pinch grip 539 to form deep pinch grip bottle 524.

Deep pinch grip 539 has a width 525 smaller than a width that would be possible in these circumstances without moveable inserts. It is difficult and costly to attempt to blow mold such a deep pinch grip bottle without using slides. Deep pinch grip 539 provides larger ledges 526 and 526 to rest on fingers and a thumb of a user. For example, ledges 526 and 528 may each have a depth indicated at dimension 527. Dimension 527 may be at least 29 milimeters, providing a secure ledge for pinch grip 539. Use of the moveable inserts can increase the depth of the ledges from 16 millimeters to 29 millimeters and decrease the width 525 of the grip from 3 and ⅛ inch to 2 and ⅛ inch in a 1.75 liter bottle, for example. This is especially beneficial in a large heavy bottle, such as a 1.75 liter liquor bottle. Deep pinch grip 539 provides stability in an energy- and plastic-efficient design.

The inventors have devised several ways of adding moveable inserts to a blow molding station in a manner having a profile low enough to permit use of an otherwise standard blow molding module. In one embodiment, the moveable inserts are moved by a low-profile piston preferably contained in a mold hanger. In another embodiment, the moveable inserts are moved by a low-profile cam preferably contained in a mold. A low-profile piston and a low-profile cam are both means for driving moveable inserts.

Figure 3:
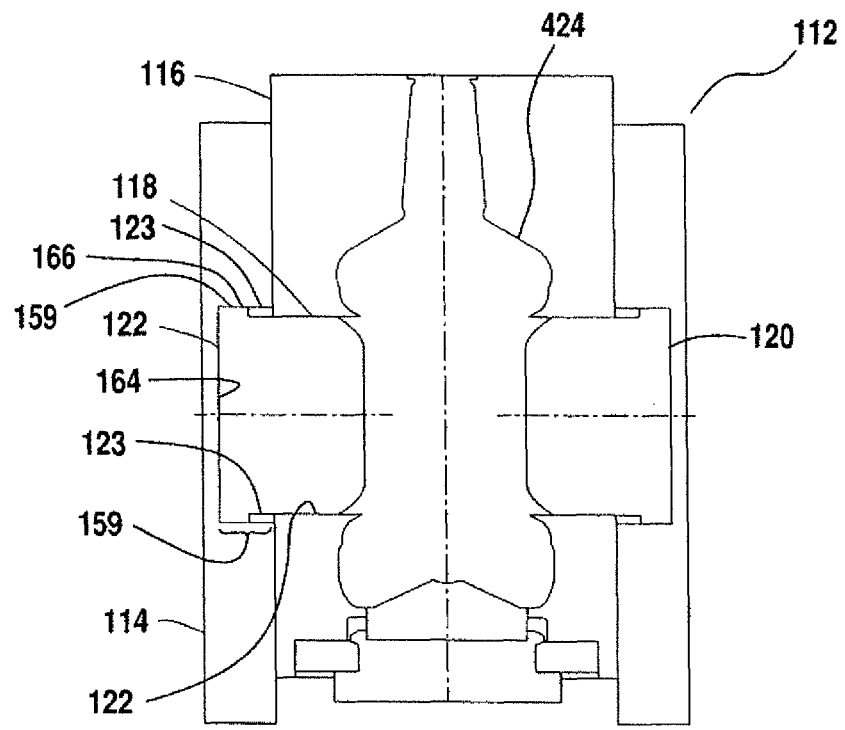
FIG. 3 is a front view of part of an inventive blow molding station at an early stage of operation.

FIG. 3 is a front view of part of an inventive blow molding station 112 with mold hanger 114 and mold 116, at an early stage of operation. Initial shape 424 is still molten and moveable inserts 118 and 120 are just about to start travelling inward from the outward position shown in FIG. 3. Piston 166 is provided in piston sleeve 159. In this figure, piston top 165 of piston 166 is adjacent piston sleeve head end 164. Piston 166 is ready to start pushing moveable insert 118 inward through insert pocket 122, by piston 166 advancing in piston sleeve 159 into annular space 123.

Figure 4:
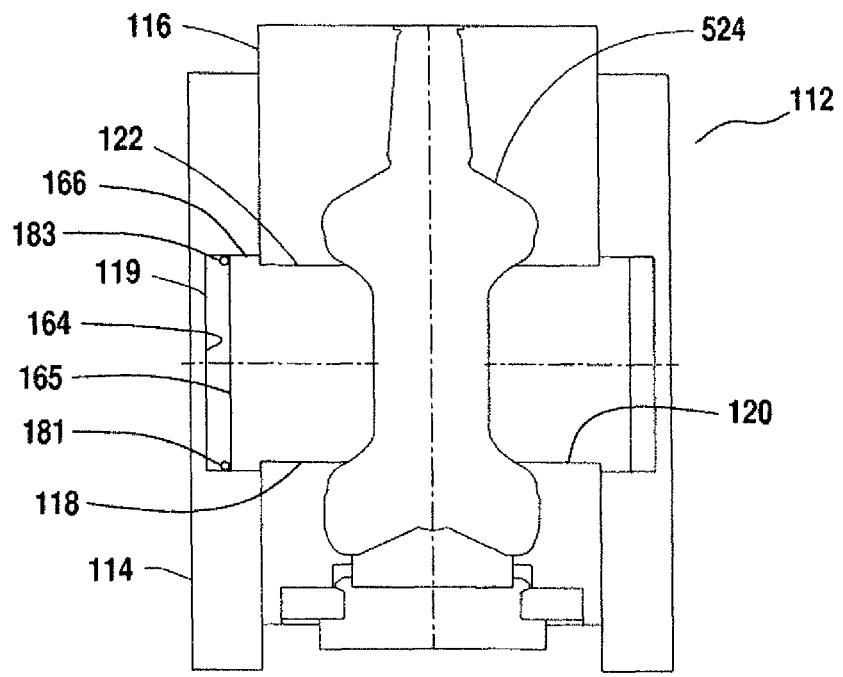
FIG. 4 is a front view of the part of an inventive blow molding station from FIG. 3, shown at a later stage.

FIG. 4 is a front view of the part of an inventive blow molding station from FIG. 3, shown at a later stage. Initial shape 424 has been pushed inward by inserts 118 and 120, to form bottle 524. The movement of piston 166 has filled annular space 123 and vacated annular space 119. That motion has pushed inserts 118 through insert pocket 122.

At the stage shown in FIG. 4, piston top 165 has advanced beyond optional latches 181 and 183. Latches 181 and 183 may be moved from outside piston sleeve 159 to protrude into annular space 119 by fluid pressure or spring force, for example. By thus protruding, latches 181 and 183 resist movement of piston 166 in the outward direction. Such engagement of latches 181 and 183 can ensure moveable insert 118 stays in place in its inward position even if air pressure blowing outward from center line 193 applies outward pressure to moveable insert 118. Latches 181 and 183 may remain engaged until bottle 524 has hardened sufficiently to move piston 166 back to its outward position where piston top 165 is adjacent piston sleeve head end 164. At that time, latches 181 and 183 may be disengaged by application or release of spring or fluid pressure, for example.

Figure 10:
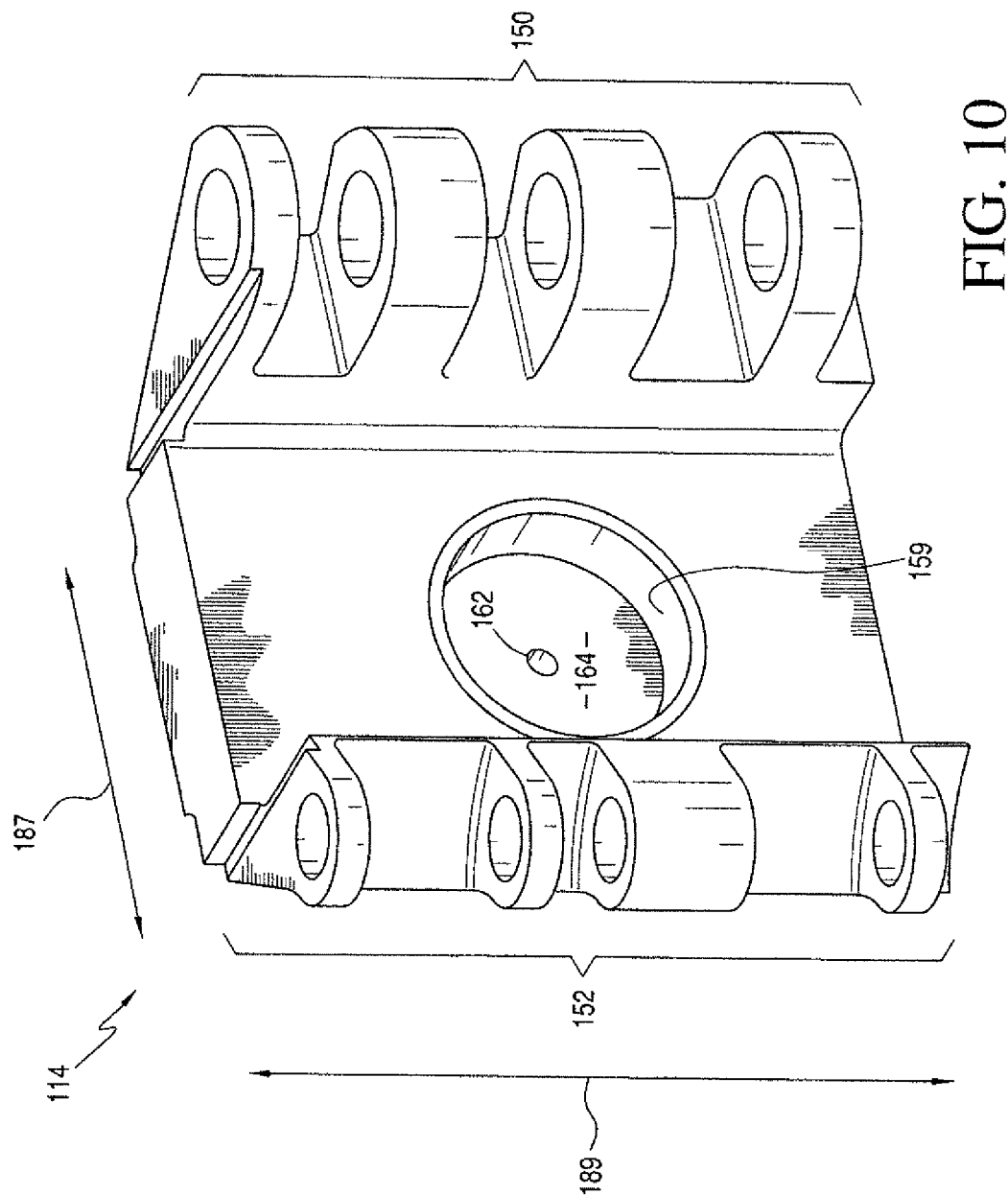
FIG. 10 is a perspective view of an inventive mold hanger.

FIG. 10 is a perspective view of an inventive mold hanger. Piston sleeve 159 meets piston sleeve head end 164 in mold hanger 114. Piston sleeve head end 164 has first source of fluid pressure 162 centered therein. Mold hanger 114 has hinge 150 to be rotatably secured to the back of blow molding station 112 and clasp 152 to close the front of blow molding station 112 during blow molding. Mold hanger 114 may be characterized by vertical direction 189 and horizontal direction 187.

Figure 11:
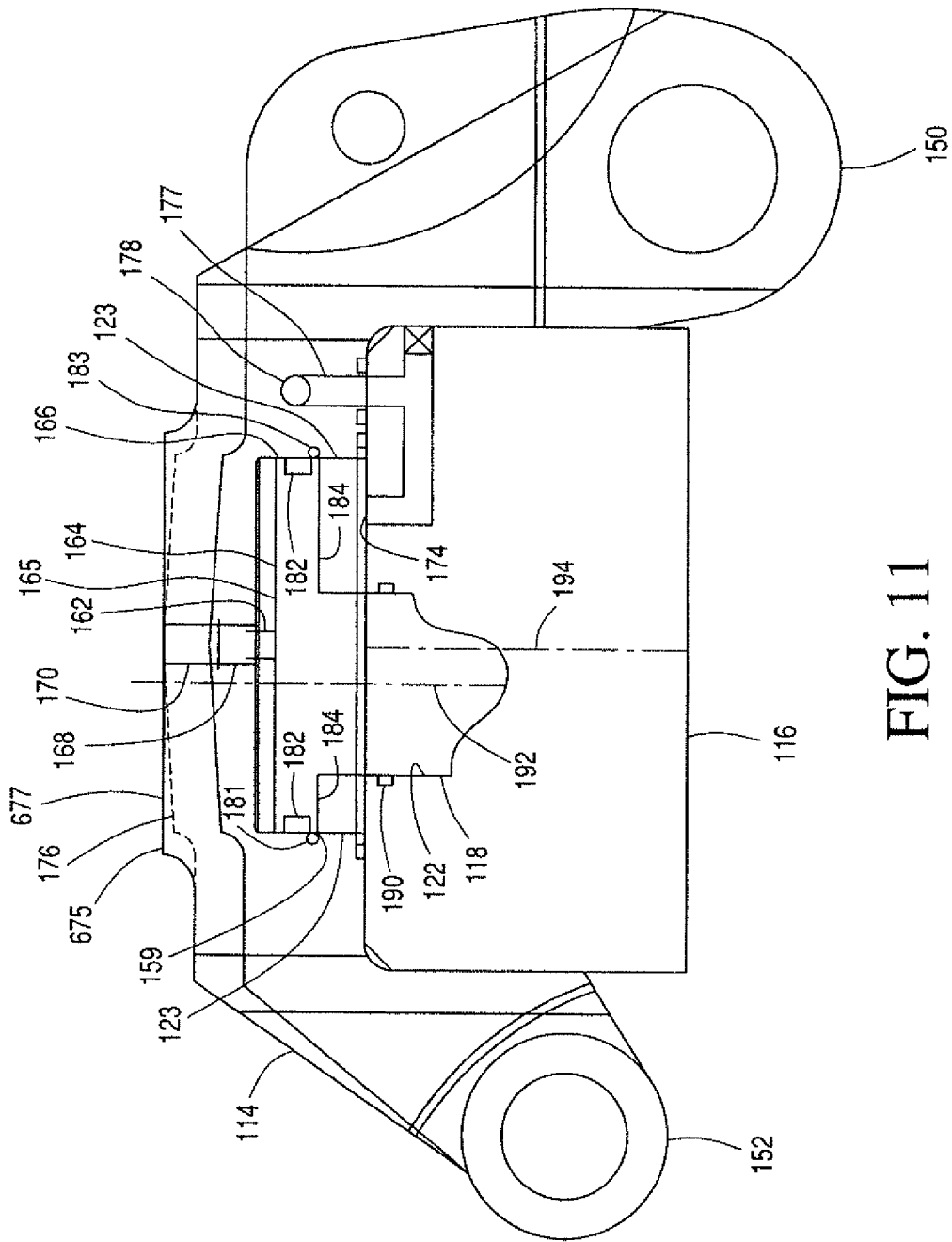
FIG. 11 is a top down view of an inventive mold hanger, piston, and mold.

FIG. 11 is a top down view of an inventive mold hanger, piston, and mold. Piston 166 rides in piston sleeve 122, secured by annular seal 182. Piston 166 drives moveable insert 118 in insert picket 122, guided by guides 190 cooperating with bushings (not shown). Duct 170 may have a female pipe thread and brings fluid pressure through high pressure fluid inlet hole 168 to first source of fluid pressure 162. Duct 170 preferably travels down within hanger 114 to obtain fluid pressure from the bottom of blow molding station 112. Alternately, duct 170 may connect to a feed hose supplying fluid pressure. Fluid pressure form first source of fluid pressure 162 presses against piston top 165 to urge piston 166 inwardly in piston sleeve 159 which in turn pushes moveable insert 118 inwardly in moveable insert pocket 122. The fluid in moveable insert pocket 122 may be exhausted to feed hole 178 via passage 177 in mold hanger 114. Feed hole 178 is preferably a low pressure air return line which originates at the bottom of mold hanger 114.

Once piston 166 and moveable insert 118 are in their inward position, they form deep pinch grip 539 as previously described. When deep pinch grip bottle 524 is sufficiently hardneded, moveable insert 118 can be moved in back to its outward position, forcing piston top 165 out to its outward position adjacent piston sleeve head end 164. This backward movement can be accomplished by applying fluid pressure against the bottom 184 of piston 166, such as by introducing fluid pressure from second source of fluid pressure 174 supplied by duct 187 through passage 177.

In FIG. 11, optional latches 181 and 183 are shown in their disengaged position.

FIG. 12 is a diagram of a prior art module with blow molding stations for blow molding containers.

Figure 13:
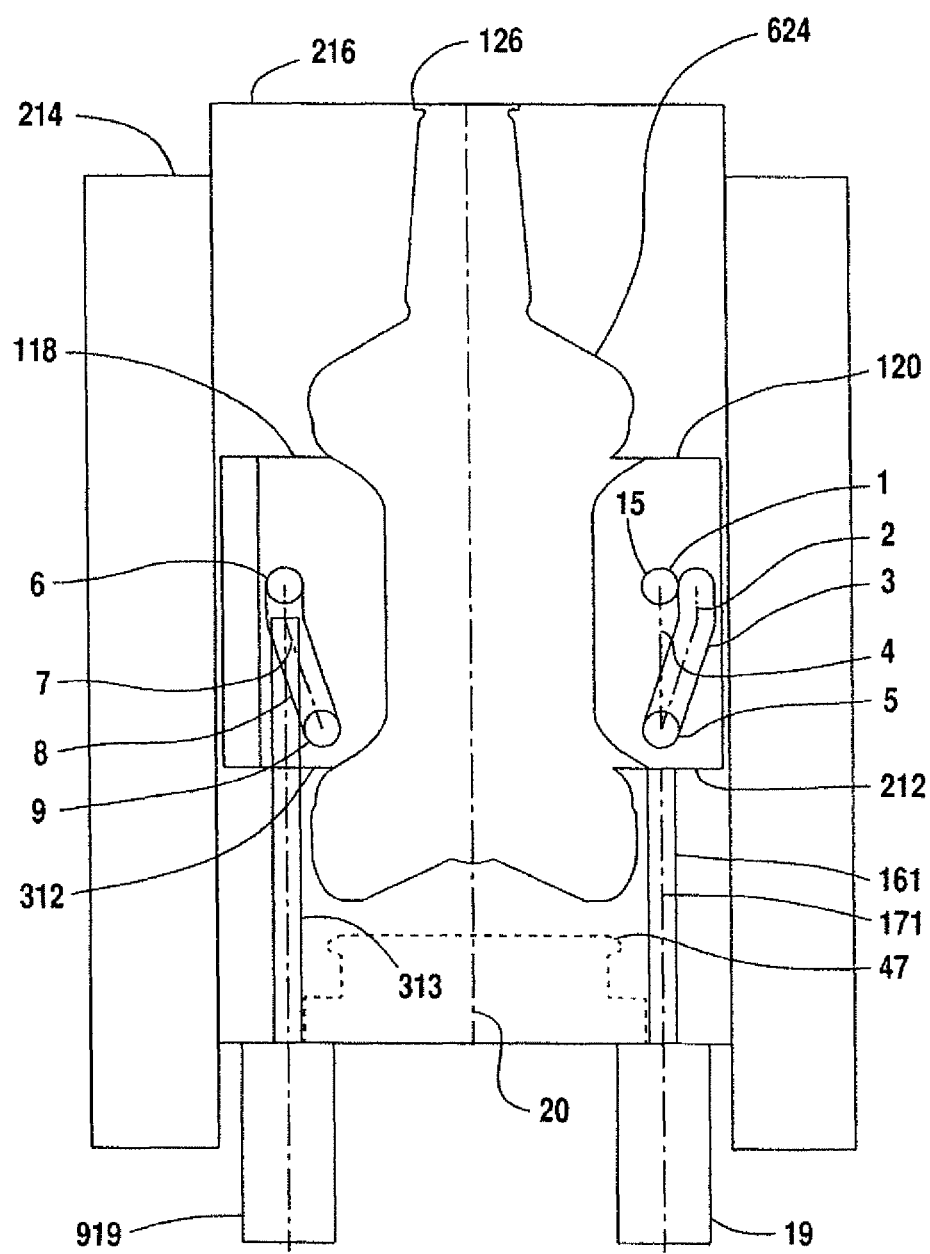
FIG. 13 is a composite front view of an inventive blow molding station shown at two different times.

FIG. 13 is a composite front view of an inventive blow molding station shown at two different times. Mold 216 is secured by mold hanger 214 and contains moveable insert 118. Moveable insert 118 is completely contained within mold 216. As shown in the right half of FIG. 13, moveable insert 120 is in its outward position. Fluid actuation cylinder 19 is prepared to push cylinder 161 up through path 171 to force cam follower 15 from position 5 to position 1 along path 4. Because the groove 3 cam follower 15 rides in is angled outwardly and upwardly, the force of cam follower 15 being forced from position 5 to position 1 pushes moveable insert 120 inwardly under the force of the inclined plane along dogleg path 2.

The inward position is shown at a later time in the left half of FIG. 13. There, the cam follower is in the up position 6, holding moveable insert 118 in its inward position to form a deep grip pinch in bottle 624. When bottle 624 is sufficiently cooled and hardened in mold cavity 126, moveable insert 118 can be moved to the outward position by fluid actuation cylinder 919 operating in reverse. That is, fluid actuation cylinder 919 pulls the cam follower from position 6 to position 9 along dogleg path 7 in groove 8. Because groove 8 is angled downwardly and inwardly, pulling the cam follower down from position 6 to position 9 applies an inclined plane force pulling moveable insert 118 outward away from bottle 624 and out of cavity 126.

Thus, drive mechanism 312 comprises a cam follower or roller in groove 8 and cylinder shaft 313, all contained in mold 216.

Figure 14:
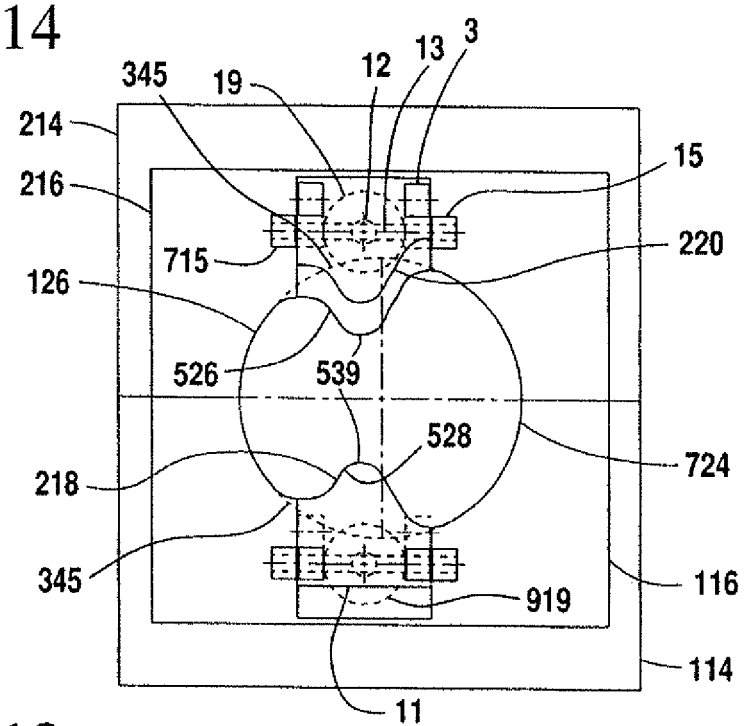
FIG. 14 is a top down plan of the composite view shown in FIG. 13.

FIG. 14 is a top down plan of the composite view shown in FIG. 13. In the bottom half, moveable element 218 is in the inward position. In the top half, moveable element is shown being retracted from the inward position shown in the bottom half, at a later time than that depicted in the bottom half. Cylinder linkage 12 is shown linking cylinder 161 with cam follower 15 via shaft 13 holding cam follower 15 and cam follower 715.

In one exemplary embodiment, the invention comprises a mold hanger 114 for supporting a bottle mold 116 in a blow molding station 112, the mold hanger 114 having a vertical direction 189 and a horizontal direction 187, the mold hanger 114 comprising a piston sleeve 159 fully contained within the mold hanger 114 and orthogonal to both the vertical direction 189 and the horizontal direction 187; a piston sleeve head end 164 capping the piston sleeve 159; a piston 166 slideably engaged with and fully contained within the piston sleeve 159, the piston 166 having a piston top 165 conforming to the size and shape of the piston sleeve head end 164 and a piston bottom 184; a moveable insert 118 integral with the piston bottom 184 and configured to be pushed by the piston bottom 184 in an inward direction away from the piston sleeve head end 164 into a mold 116 supported by the mold hanger 114; and a first source of fluid pressure 162 configured to apply pressure to the piston top 165 to push the piston 166 slideably away from the piston sleeve head end 164 and toward the mold 116; wherein the piston top 165 has an area larger than a cross sectional area of the moveable insert 118.

The mold hanger 114 may have a second source of fluid pressure 174 configured to apply pressure to the piston bottom 184 to push the piston 186 slideably toward the piston sleeve head end 164.

The first source of fluid pressure 162 preferably provides pressurized air from a pressurized air source that is also used to blow mold a bottle 24 in the bottle mold. Alternatively, the first source of fluid pressure 162 may provide hydraulic pressure.

Preferably, fluid pressure from the first source of fluid pressure 162 is sufficient to hold piston 166 and moveable insert 118 in the inward position shown in FIGS. 3 and 9 against outward pressure from pressurized air used to mold the bottle. However, latches 181 and 183 may be provided to hold piston 166 and moveable insert 118 in that inward position. Latches 181 and 183 may contain springs and/or may be actuated by fluid pressure available in mold hanger 114.

A central axis 192 of piston 166 may be parallel to and laterally displaced from a central axis 194 of moveable insert 118. This lateral offset may provide room for second source of fluid pressure 174 to communicate with fluid passage 178 in mold hanger 114. The lateral offset may permit piston 166 to be centered along the horizontal direction 187 of mold hanger 114 while moveable insert 118 is off center to provide deep grip 539 offset from the center of the bottle which may be at axis 192.

Moveable insert 118 of mold hanger 114 may be configured to be pushed at least about one half inch into mold 116 supported by mold hanger 114. With such inserts in both halves of mold 116, deep grip 539 may be at least one inch deeper than without the insert. This may permit ledges 526 and 528 each to have a depth 527 of at least 29 millimeters instead of only about 16 millimeters without the moveable insert.

Piston sleeve 159 may be no more than one inch long in its axial direction along its axis 194. This length accommodates both the travel distance of piston 166 and the thickness of piston 166 itself. For example, if piston 166 is one half inch thick, piston 166 may travel one half inch within a one inch piston sleeve 159. If piston 166 were one quarter inch thick, piston 166 could travel three quarters of an inch within a one inch piston sleeve 159.

With the low profile of a once inch piston sleeve 159, mold hanger 114 may be no more than about two inches thick in the portion 675 surrounding piston sleeve 159. Mold hanger 114 may be no more than about one inch thick in the portion 677 beyond the piston sleeve head end 164. The thickness of mold hanger 114 could be reduced further by use of stronger metal, such as titanium. The thickness of a standard existing Sidel mold hanger is shown in FIG. 11 by phantom line 172. As can be seen, the added thickness at portion 675 and 677 is minimal.

In a second exemplary embodiment, there is provided a method of retrofitting an original rotatable blow molding module 110 having multiple existing blow molding stations 112 affixed to the rotatable blow molding module 110, each existing blow molding station 112 having an existing mold hanger 14 for supporting and encasing mold 16 for a bottle 24, each existing mold hanger 14 defining an existing outer envelope 99, the method comprising: providing in each blow molding station 112 an improved mold hanger, the improved mold hanger substantially contained within the respective existing outer envelope 99 and configured to support and encase a mold for blow molding a bottle 524 from plastic; and providing in each improved mold hanger a pair of low-profile drive mechanisms configured opposably to drive a respective pair of moveable inserts 118 and 120 at least one half inch into a cavity of the mold 116 while the plastic is molten.

The method may further comprise providing a fluid pressure source in fluid communication with the drive mechanisms. The fluid pressure source may provide pneumatic or hydraulic pressure and may include pressure duct 170, for example. The method may include redirecting fluid pressure pre-existing on each existing blow molding station 112. In that case, pressure duct 170 may receive pressure from the same source of pressure used to blow mold containers in the mold, for example.

Alternately the fluid pressure source used in the method may comprise or be in fluid communication with a low profile, high pressure, canister 19. The method may include securing low profile, high pressure, canister 19 in each blow molding station below the respective mold in fluid communication with the respective drive mechanisms.

In the method, providing an improved mold hanger may comprises replacing the existing mold hanger 14. Or it may comprise reusing the existing mold hanger in altered form.

The method may include providing a drive mechanism comprising a slotted cam or a piston, for example. In the case of a piston, the piston may have a cross-sectional area larger than a cross-sectional area of the moveable insert. In this manner, the cross-sectional surface area of the piston that is impacted by fluid pressure pushing the piston in toward the mold is greater than the cross-sectional area of moveable insert subject to outward pressure from the air pressure used to blow mold a bottle in the mold. This helps ensure that the force of the drive mechanism pushing the moveable insert into the mold is strong enough to overcome friction and outward pressure even if the fluid pressure used to blow mold the bottle is the same as or less than the fluid pressure used to drive the drive mechanism inward.

In the method, the drive mechanism may be configured to drive the moveable insert within an insert pocket in the mold.

The method may be used where the original rotatable blow molding module before the retrofitting has no more than about 66 millimeters clearance between respective existing blow molding stations in operation. The rotatable blow molding module may be a ten-station Sidel-type GUPM wheel, for example. Before the retrofitting, the original rotatable blow molding module may have no moveable mold inserts.

In the method the moveable insert may be configured to move at least about one half inch into an interior cavity inside the mold.

A third exemplary embodiment provides a method of manufacturing a blow molded bottle 524 with a deep pinch grip 539 comprising: providing a mold hanger defining an outer envelope; providing in the mold banger a mold with a cavity 345 configured to receive molten plastic; providing within the outer envelope a first moveable insert 118; providing within the outer envelope a second moveable insert 120; providing within the mold hanger a first drive mechanism configured to drive the first moveable insert 118 in a first direction into the cavity 345; providing within the mold hanger a second drive mechanism configured to drive the second moveable insert 120 in a second direction into the cavity 345, the second direction being generally opposed to the first direction; blowing molten plastic into contact with the mold; and after blowing the molten plastic into contact with the mold, operating the first and second drive mechanisms to drive the first and second moveable inserts into the cavity 345 while the plastic is still pliable and form a blow-molded bottle 534 with a deep pinch grip 539.

The method may include operating the first and second drive mechanisms to drive the first moveable insert 118 at least about one half inch into the cavity 345 and to drive the second moveable insert 120 at least about one half inch into the cavity 345.

In this method, deep pinch grip 539 may have a first ledge 526 at least about 29 millimeters deep formed by the first moveable insert 118 and a second ledge at least about 29 millimeters deep formed by the second moveable insert 120, as depicted in FIG. 9. Deep pinch grip 539 may have a width 525 equal to or less than about 2⅛ inches, for example.

The exemplary method of manufacturing a blow molded bottle 524 with a deep pinch grip 539 may further comprise operating the first and second drive mechanisms in reverse to move the first and second moveable inserts away from the blow-molded bottle.

A fourth exemplary embodiment is a blow molded bottle 524 with a deep pinch grip 539 manufactured according to a method described above in the third exemplary embodiment. Such a bottle may be, for example, a 1.75 liter bottle with a deep pinch grip 539 no more than about 2 and ⅛ inch wide (shown as dimension 525 in FIG. 9) and having a ledge 526 at least about 29 millimeters deep on a first side of the grip and a ledge 528 at least about 29 millimeters deep on a second side of the grip (shown as dimension 527 in FIG. 9).

In a fifth exemplary embodiment, the invention provides a mold with a cavity for forming a deep grip container, the mold comprising: a first mold pocket configured to receive a first moveable insert; a second mold pocket configured to receive a second moveable insert; a first drive mechanism fully contained within the mold and configured to drive the first moveable insert in a first direction through the first mold pocket into the cavity; and a second drive mechanism fully contained within the mold and configured to drive the second moveable insert in a second direction through the second mold pocket into the cavity, the second direction being generally opposed to the first direction.

The first drive mechanism may include a slotted cam. The mold may further comprise a cylinder shaft positioned in a cylinder shaft hole in the mold, the cylinder shaft in mechanical cooperation with the first drive mechanism. Such a mold may also have a linkage between the cylinder shaft and the first drive mechanism. It may further have an angled roller slot in the mold, angled upward and outward in relation to the cavity and a roller mounted to the linkage and adapted to roll in the roller slot. The angled roller slot may be a dog leg configuration with a straight portion of the slot located above an angled portion. The cylinder shaft can be configured to be operated by a fluid pressure cylinder mounted to a bottom surface of the mold. The fluid pressure cylinder may operate under hydraulic or pneumatic pressure.

In the mold of the fifth exemplary embodiment, the first drive mechanism may be configured to drive the first moveable insert in the first direction at least one half inch into the cavity and the second drive mechanism may be configured to drive the second moveable insert in the second direction at least one half inch into the cavity.

In a sixth exemplary embodiment, there is provided a method of retrofitting an existing blow molding station 12 having an existing mold hanger 14 for supporting and encasing a mold 16 for a bottle 24, the existing mold hanger defining an existing outer envelope 99. The method may comprise providing in the blow molding station an improved mold hanger, the improved mold hanger substantially contained within the existing outer envelope 99 defined by the existing mold hanger 14 and configured to support and encase a mold 116 for blow molding a bottle 524 from plastic; and providing in the improved mold hanger a pair of low-profile drive mechanisms configured to opposably drive a respective pair of moveable inserts 118 and 120 at least one half inch into a cavity 345 of the mold 116 while the plastic is molten.

This method may further include providing a fluid pressure source in fluid communication with the drive mechanisms. The fluid pressure source may be configured to provide hydraulic pressure or pneumatic pressure and, on one hand, may include fluid pressure pre-existing on and redirected from the existing blow molding station.

On the other hand, the fluid pressure source may be provided by a low profile, high pressure, canister. The canister may be secured below the mold in fluid communication with the drive mechanisms.

In the sixth exemplary embodiment, providing an improved mold hanger may include replacing the existing mold hanger, reusing the existing mold hanger in altered form, or reusing the existing mold hanger. Providing in the improved mold hanger a pair of low-profile drive mechanisms may include providing the drive mechanisms in a mold supported by the existing mold hanger.

In the method of retrofitting an existing blow molding station, the improved mold hanger laterally extends beyond the existing outer envelope by a cumulative total of less than the clearance distance 130, e.g. 66 millimeters. To include a safety margin, the improved mold hanger laterally extends beyond the existing outer envelope by a cumulative total of less than 41 millimeters. In the disclosed method, the improved mold hanger can easily be arranged to extends laterally beyond the existing outer envelope by a cumulative total of less than 26 millimeters. By making certain adjustments, the improved mold hanger will not extend laterally beyond the existing outer envelope 99 at all.

The drive mechanism in this method may be configured to drive the moveable insert within an insert pocket in the mold. The moveable insert may be configured to slide within the insert pocket at least about one half inch into an interior cavity inside the mold.

In this method the existing blow molding station 12 may be part of a ten-station Sidel-type GUPM wheel indicated in FIG. 12 or a sixteen-station Sidel-type GUPM wheel indicated in FIG. 1, for example.

In this exemplary method, the drive mechanism may comprise a slotted cam or a piston, for example. In the case of a piston, the top surface 165 of the piston may have a cross-sectional area larger than a cross-sectional area of the moveable insert.

In a seventh exemplary embodiment, there is provided a method of manufacturing a blow molded bottle with a deep pinch grip comprising: providing a mold hanger having an outer envelope; providing in the mold hanger a mold with a cavity configured to receive molten plastic; providing within the outer envelope a first pocket configured to receive a first moveable insert; providing within the outer envelope a second pocket configured to receive a second moveable insert; providing within the outer envelope a first drive mechanism configured to drive the first moveable insert in a first direction through the first pocket into the cavity; providing within the outer envelope a second drive mechanism configured to drive the second moveable insert in a second direction through the second mold pocket into the cavity, the second direction being generally opposed to the first direction; blowing molten plastic into contact with the mold; and after blowing the molten plastic into contact with the mold, operating the first and second drive mechanisms to drive the first and second moveable inserts into the cavity while the plastic is still pliable and form a blow-molded bottle with a deep pinch grip.

This exemplary method may further include operating the first and second drive mechanisms in reverse to move the first and second moveable inserts away from the blow-molded bottle.

An eighth exemplary embodiment is a blow molded bottle with a deep pinch grip manufactured according to the method of the seventh exemplary embodiment. This bottle may be a 1.75 liter bottle with a deep pinch grip no more than about 2 and ⅛ inch wide and having a ledge at least about 29 millimeters deep on a first side of the grip and a ledge at least about 29 millimeters deep on a second side of the grip. Any of the bottles mentioned herein may desirably be a 1.75 liter liquor bottle.

We claim:

1. A method of manufacturing a blow molded bottle with a deep pinch grip comprising:
    providing a mold hanger defining an outer envelope having a first moveable insert and a second moveable insert therein, and a mold in the mold hanger with a cavity configured to receive molten plastic, the mold hanger having a first drive mechanism configured to drive the first moveable insert in a first direction into the cavity from an outward position to an inward position, the first drive mechanism further configured to return the first moveable insert toward the outward position when operated in reverse and a second drive mechanism configured to drive the second moveable insert in a second direction into the cavity from an outward position to an inward position, the second drive mechanism further configured to return the second moveable insert toward the outward position when operated in reverse, the second direction being generally opposed to the first direction;
    blowing molten plastic into contact with the mold; and
    after blowing the molten plastic into contact with the mold, operating the first and second drive mechanisms to drive the first and second moveable inserts into the cavity while the plastic is still pliable and form a blow-molded bottle with a deep pinch grip.

2. The method of claim 1, further comprising providing a fluid pressure source in fluid communication with the drive mechanisms.

3. The method of claim 2, wherein the fluid pressure source is configured to provide hydraulic pressure.

4. The method of claim 2, wherein the fluid pressure source is configured to provide pneumatic pressure.

5. The method of claim 2, wherein the fluid pressure source comprises a low profile, high pressure, canister.

6. The method of claim 1, wherein at least one of the first and second drive mechanisms comprises a slotted cam.

7. The method of claim 1 wherein at least one of the first and second drive mechanisms comprises a piston.

8. The method of claim 7, wherein the piston has a cross-sectional area larger than a cross-sectional area of at least one of the moveable inserts.

9. The method of claim 1, wherein at least one of the first and second drive mechanisms is configured to drive at least one of the moveable inserts within an insert pocket in the mold.

10. The method of claim 1, wherein operating the first and second drive mechanisms comprises:
    driving the first moveable insert at least about one half inch into the cavity; and
    driving the second moveable insert at least about one half inch into the cavity.

11. The method of claim 1, wherein the deep pinch grip has a first ledge at least about 29 millimeters deep formed by the first moveable insert and a second ledge at least about 29 millimeters deep formed by the second moveable insert.

12. The method of claim 1, wherein the bottle is large enough to contain at least about 1.75 liters of liquid.

13. The method of claim 12, wherein the grip is no more than about 2 and ⅛ inch wide.

14. The method of claim 1, further comprising operating the first and second drive mechanisms in reverse to move the first and second moveable inserts away from the blow-molded bottle.

\* \* \* \* \*